(12) United States Patent
Sforzin et al.

(10) Patent No.: US 12,072,766 B2
(45) Date of Patent: Aug. 27, 2024

(54) DATA PROTECTION AND RECOVERY

(71) Applicant: Micron Technology, Inc., Boise, ID (US)

(72) Inventors: Marco Sforzin, Cernusco Sul Naviglio (IT); Paolo Amato, Treviglio (IT); Joseph M. McCrate, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/959,412

(22) Filed: Oct. 4, 2022

(65) Prior Publication Data
US 2024/0111629 A1  Apr. 4, 2024

(51) Int. Cl.
*G06F 11/10* (2006.01)

(52) U.S. Cl.
CPC .................. *G06F 11/1096* (2013.01)

(58) Field of Classification Search
CPC .................................................. G06F 11/1096
See application file for complete search history.

(56) References Cited

U.S. PATENT DOCUMENTS

| | | | | |
|---|---|---|---|---|
| 3,859,630 A | * | 1/1975 | Bennett | H04L 1/0057 714/757 |
| 4,646,303 A | * | 2/1987 | Narusawa | G11B 20/1813 714/784 |
| 7,334,159 B1 | * | 2/2008 | Callaghan | G11C 29/16 714/6.24 |
| 10,248,497 B2 | * | 4/2019 | Nair | G06F 11/1004 |
| 11,409,601 B1 | | 8/2022 | Brewer et al. | |
| 2006/0048031 A1 | * | 3/2006 | Aadsen | G06F 11/1008 714/E11.034 |
| 2009/0172499 A1 | * | 7/2009 | Olbrich | G06F 3/0604 714/773 |
| 2010/0122148 A1 | * | 5/2010 | Flynn | G11C 16/3422 714/E11.034 |
| 2014/0250350 A1 | * | 9/2014 | Vitale | H04L 1/0045 714/776 |
| 2016/0117221 A1 | * | 4/2016 | Nair | G06F 11/108 714/764 |
| 2017/0091025 A1 | * | 3/2017 | Ahn | G06F 11/1024 |

* cited by examiner

*Primary Examiner* — Samir W Rizk

(74) *Attorney, Agent, or Firm* — Brooks, Cameron & Huebsch, PLLC

(57) ABSTRACT

A redundant array of independent disks (RAID) protection can be provided along with other types of error correction code (ECC) schemes that correct either errors in data prior to the data being input to the RAID process or residual errors from the RAID process. The ECC schemes can utilize parity bits generated using a parity matrix whose bit patterns have an amount of bits that can be used to identify a location of the memory system from which data corresponding to the respective bit pattern is read.

25 Claims, 9 Drawing Sheets

DATA PROTECTION AND RECOVERY

TECHNICAL FIELD

The present disclosure relates generally to semiconductor memory and methods, and more particularly, to apparatuses, systems, and methods related to providing data protection and recovery schemes.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
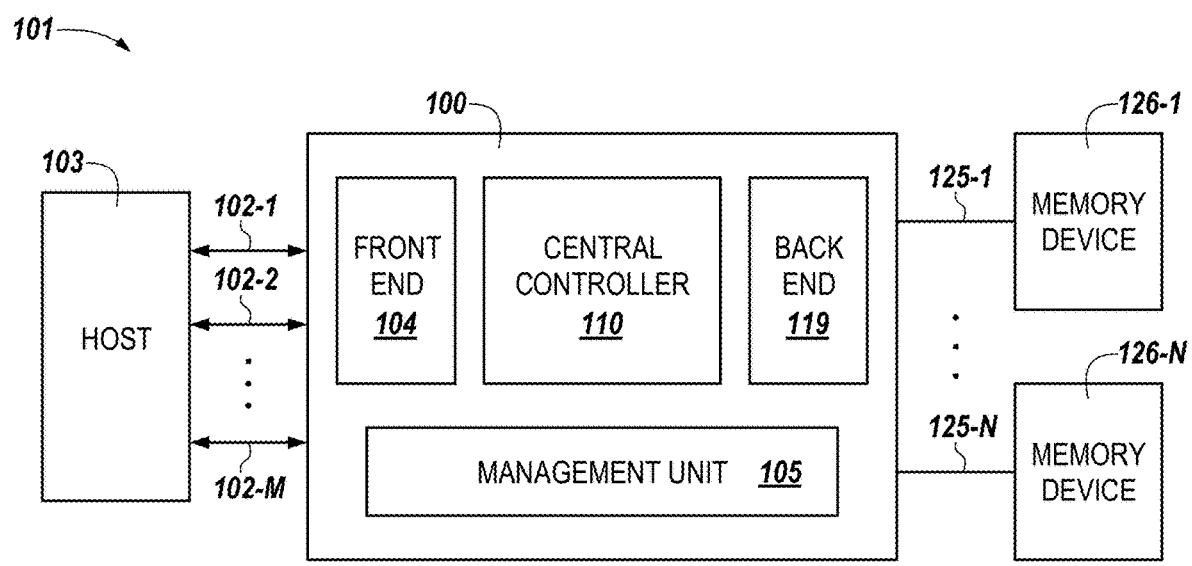
FIG. 1 is a functional block diagram of a computing system including a memory controller in accordance with a number of embodiments of the present disclosure.

Systems, apparatuses, and methods related to providing protection and recovery schemes are described. Data protection and recovery schemes are often an important aspect of RAS (Reliability, Availability, and Serviceability) associated with memory systems. Such schemes may provide a "chip kill", in which the memory system can work properly even if a constituent chip, such as a memory die, is damaged; thereby, avoiding a situation of one of the chips being a single point of failure (SPOF) of the memory system. Often, the chip kill capability is provided through various error correction code (ECC) schemes, such as a "Redundant Array of Independent Disks" (RAID) scheme, which allow data recovery of the damaged chip by reading subsets of data from all of the constituent chips of the memory system.

Embodiments are directed to providing additional error correction and/or detection capabilities that operate in conjunction with the RAID scheme. These error correction and detection capabilities can be provided by one or more parity bits that are generated using a parity matrix. The parity matrix used to generate the parity bits can include a number of rows (alternatively referred to as "bit patterns"). In a number of embodiments, each bit pattern can include an amount of bits that can be used to identify a location (e.g., memory die) of the memory system from which the subset is read, while the other bits of each bit pattern can be used to indicate a respective bit position within the subset.

The parity bits for providing the error correction and/or detection capabilities can be used to perform an error correction operation (in addition to a RAID process), which corrects an amount of bit errors in a subset (as compared to reconstructing the subset using other subsets via the RAID process). In one aspect, the error correction operation can be provided prior to the RAID process to correct an amount of bit errors to avoid a subset from being reconstructed via the RAID process using one or more constituent subsets having bit errors, which may cause a failure of the reconstruction. In another aspect, the error correction operation can be provided subsequent to the RAID process to correct an amount of residual bit errors.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transferred, read, transmitted, received, or exchanged by electronic signals (e.g., current, voltage, etc.).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 (alternatively referred to as "memory system") including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. As an example, the interface of the front end 104 can be a PCIe 5.0 or 6.0 interface coupled to the I/O lanes 102. In some embodiments, the memory controller 100 can receive access requests involving the memory device 126 via the PCIe 5.0 or 6.0 interface according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or data recovery information based on data received from the host 103. The central controller portion 110 can perform error detection operations and/or data recovery operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An error correction operation (alternatively referred to as error correction code (ECC) operation) can be performed to correct an amount of bit errors and/or detect an amount of bit errors that may have not been corrected using the ECC operation. Error correction information used to perform the ECC operation can be parity data (alternatively referred to as "ECC bits" or "ECC data"), which are generated by comparing (e.g., XORing) at least a portion of rows (e.g., bit patterns) of encoding matrix (alternatively referred to as a parity matrix) that respectively correspond to bits of user data (e.g., data received from the host 103) having a particular value.

A data recovery operation (alternatively referred to as data recovery operation) can a chip kill operation, which protects the memory system even if a constituent chip (e.g., a memory die, such as a memory die 327 illustrated in FIG. 3) is damaged; thereby, avoiding a situation of one of the chips being a single point of failure (SPOF) of the memory system. Often, the chip kill capability is provided through various ECC schemes including a "Redundant Array of Independent Disks" (RAID) scheme., which allow data recovery of the damaged chip by reading all of the constituent chips of the memory system.

The chip kill can involve parity data (e.g., RAID parity) that are specifically designed for data recovery of the damaged chip. The RAID parity data can be generated by comparing (e.g., XORing) each subset of user data (e.g., subset 731 and/or 831 illustrated in FIGS. 7 and 8, respectively). The user data that share the same RAID parity data can be referred to as being grouped together. A RAID operation can be alternatively referred to as "data recovery operation". While the error correction operation (e.g., ECC operation) is performed to correct (e.g., flip) one or more bits of the subset that is indicated as having errors, the data recovery operation reconstructs and recover the subset (without flipping one or more bits of the subset) using the other subsets.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types of data buses, such as a eight-pin data bus (e.g., data input/output (DQ) bus) and a one-pin data mask inversion (DMI) bus, among other possible buses.

The memory devices 126 can be various/different types of memory devices. For instance, the memory device can include an array RAM, ROM, DRAM, SDRAM, PCRAM, RRAM, and flash memory cells, among others. In embodiments in which the memory device 126 includes persistent or non-volatile memory, the memory device 126 can be flash memory devices such as NAND or NOR flash memory devices. Embodiments are not so limited, however, and the memory device 126 can include an array of other non-volatile memory cells such as non-volatile random-access memory cells (e.g., non-volatile RAM (NVRAM), ReRAM, ferroelectric RAM (FeRAM), MRAM, PCRAM), "emerging" memory cells such as a ferroelectric RAM cells that includes ferroelectric capacitors that can exhibit hysteresis characteristics, a memory device with resistive, phase-change, or similar memory cells, etc., or combinations thereof.

As an example, a FeRAM device (e.g., a memory device 126 include an array of FeRAM cells) can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

In another example, the memory devices 126 can be a dynamic random access memory (DRAM) device (e.g., the memory device 126 including an array of DRAM cells) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 primarily in forms of a memory transfer block (MTB) that includes a number of user data blocks (UDBs). As used herein, the term "MTB" refers to a group of UDBs that are grouped with a same parity data block (PDB) (e.g., share a same PDB); therefore, are transferred together from a cache (e.g., the cache 212) and/or memory devices 126 for each read or write command. For example, the group of UDBs of the same MTB can be transferred to/from (e.g., written to/read from) the memory devices 126 via the channels 125 over a predefined burst length (e.g., a 16-bit or 32-bit BL) that the memory controller 100 operates with.

A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers, while 16-bit burst length can be made up of 16 beats of data transfers. Although embodiments are not so limited, a bus width corresponding to a size of each beat can be 8 (e.g., alternatively referred to as "x8").

As used herein, the term "PDB" refers to a data block containing parity data (e.g., RAID parity) for a chip kill (e.g., RAID) operation on UDBs that are grouped with the PDB. As further described herein, an MTB can be in a plain text or cypher text form depending on whether the MTB has been encrypted at the memory controller 100 (e.g., the security encoder 217-1 illustrated in FIGS. 2A and 2B).

As used herein, the term "UDB" refers to a data block containing host data (e.g., received from the host 103 and alternatively referred to as "user data"). While an UDB can correspond to a size of a host read and/or write request, an MTB can be a unit of read and/or write access to the memory devices. Along with the MTB, a PDB can be also transferred between the back end portion 119 and the memory devices 126. The host data or the parity data of a single UDB or PDB can correspond to multiple codewords (e.g., 64 codewords).

Along with the UDB, other "extra" bits of data (e.g., other data in addition to data corresponding to an UDB and alternatively referred to as "auxiliary data") can also be transferred between the back end portion 119 and the memory devices 126. The extra data can include data used to correct and/or detect errors in UDB and/or authenticate and/or check data integrity of the UDB, and/or metadata, although embodiments are not so limited. Further details of the extra bits are illustrated and described in connection with FIGS. 2-3.

In some embodiments, some (e.g., one or more) memory devices 126 can be dedicated for PDBs. For example, memory devices configured to store UDBs can be different from a memory device (e.g., one or more memory devices) configured to store PDBs.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2A:
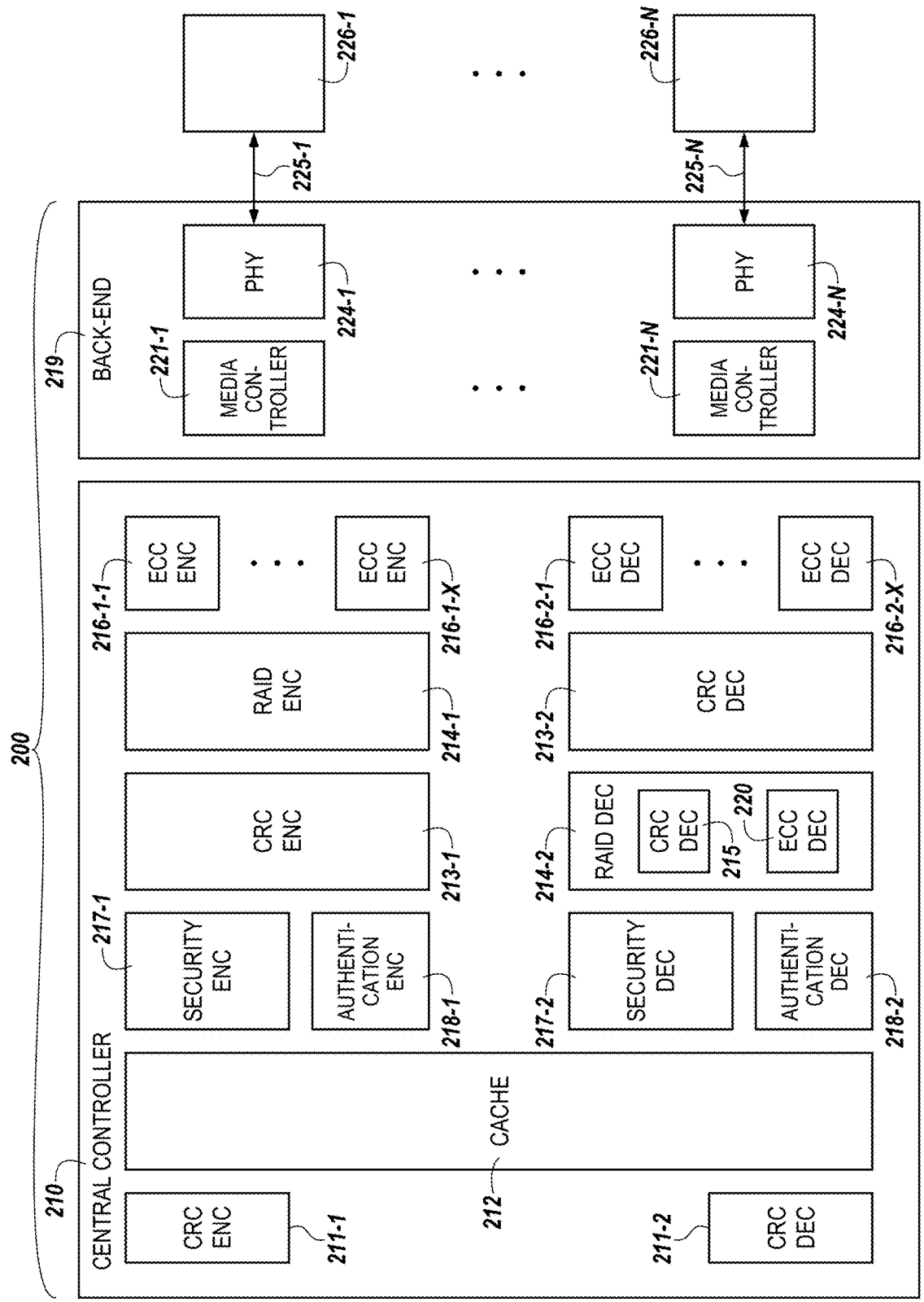
FIG. 2A is a functional block diagram of a memory controller having a redundant array of independent disks (RAID) encoder/decoder in accordance with a number of embodiments of the present disclosure.

FIG. 2A is a functional block diagram of a memory controller 200 for cache line data protection in accordance with a number of embodiments of the present disclosure.

The memory controller 200, the central controller portion 210, the back end portion 219, and the memory devices 226 illustrated in FIG. 2A are analogous to the memory controller 100, the central controller portion 210, the back end portion 119, and the memory devices 126 illustrated in FIG. 1.

The central controller portion 210 includes a front-end CRC ("FCRC") encoder 211-1 (e.g., paired with a FCRC decoder 211-2) to generate error detection information (e.g., alternatively referred to as end-to-end CRC (e2e CRC)) based on data (e.g., an UDB in "plain text" form) received as a part of a write command (e.g., received from the host 103) and before writing the data to the cache 212. The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to an UDB.

The central controller portion 210 includes a cache 212 to store data (e.g., user data), error detection information, error correction information, and/or metadata associated with performance of the memory operation. An example of the cache 212 is a thirty-two (32) way set-associative cache including multiple cache lines. While host read and write commands can be a size of an UDB (e.g., 64 bytes), the cache line size can be greater than a size of an UDB (e.g., equal to a size of multiple UDBs). For example, the cache line size can correspond to a size of 2 UDBs (with each UDB being a 64-byte chunk), such as 128 bytes.

These UDBs stored in each cache line (e.g., alternatively referred to as "UDBs corresponding to a cache line") can be a data transfer unit of data paths between the cache 212 and the memory devices 226. For example, even though a host read/write command is a size of an UDB, such as 64 bytes, the UDBs corresponding to a cache line can be collectively transferred between the cache 212 and the memory devices 226 (e.g., through other encoder/decoder illustrated in FIG. 2A) as a chunk. Therefore, the UDBs corresponding to a cache line can be collectively encrypted/decrypted at various encoder/decoders illustrated in FIG. 2A and located between the cache 212 and the memory devices 226. Therefore, UDBs corresponding to a cache line can correspond to a same RAID stripe as further described below.

Data (e.g., UDBs) stored in (e.g., a respective cache line of) the cache 212 can be further transferred to the other components (e.g., a security encoder 217-1 and/or an authenticity/integrity check encoder 218-1, which is shown as "AUTHENTICATION ENC" 218-1) of the central controller portion 210 (e.g., as part of cache writing policies, such as cache writeback and/or cache writethrough) to be ultimately stored in the memory devices 226 to synchronizes the cache 212 and the memory devices 226 in the event that the data received from the host (e.g., the host 103 illustrated in FIG. 1) have not been written to the memory devices 226 yet.

Use of the cache 212 to store data associated with a read operation or a write operation can increase a speed and/or efficiency of accessing the data because the cache 212 can prefetch the data and store the data in multiple 64-byte blocks in the case of a cache miss. Instead of searching a separate memory device in the event of a cache miss, the data can be read from the cache 212. Less time and energy may be used accessing the prefetched data than would be used if the memory system has to search for the data before accessing the data.

The central controller portion 210 further includes a security encoder 217-1 (e.g., paired with a security decoder 217-2) to encrypt data (e.g., UDBs corresponding to a cache line) before transferring the data to a CRC encoder 213-1 (to write the data to the memory devices 226). Although embodiments are not so limited, the pair of security encoder/decoder 217 can operate using an AES encryption/decryption (e.g., algorithm). Unencrypted data (e.g., plain text) can be converted to cypher text via encryption by the security encoder 217-1. The central controller portion 210 further includes an authenticity/integrity check encoder 218-1 to generate authentication data based on data received from the cache 212. Although embodiments are not so limited, the authentication data generated at the authenticity/integrity check encoder 218-1 can be MAC, such as KECCAK MAC (KMAC) (e.g., SHA-3-256 MAC).

In some embodiments, the MAC generated at the authenticity/integrity check encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authenticity/integrity check encoder 218-1 can operate in parallel. For example, the data stored in the cache 212 and that are in plain text form can be input (e.g., transferred) to both the security encoder 217-1 and the authenticity/integrity check encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authenticity/integrity check encoder 218-1.

The central controller portion 210 includes a CRC encoder 213-1 (e.g., paired with a CRC decoder 213-2) to generate error detection information (e.g., alternatively referred to as CRC media (CRCm)) based collectively on UDBs corresponding to a cache line received from the security encoder 217-1. The data transferred to the CRC encoder 213-1 from the security encoder 217-1 can be in cypher text form as the data were previously encrypted at the security encoder 217-1. The error detection information generated at the error detection information generator 213-1 can be a check value, such as CRC data. The CRC encoder 213-1 and CRC decoder 213-2 can operate on data having a size equal to or greater than a cache line size.

The central controller portion 210 includes RAID encoder 214-1 (e.g., paired with a RAID decoder 214-2) to generate and/or update RAID parity data (e.g., a PDB) based at least in part on data (e.g., one or more UDBs corresponding to a cache line) received from the CRC encoder 213-1. The data transferred to the RAID encoder 214-1 from the CRC encoder 213-1 can be in cypher text form as the data were encrypted at the security encoder 217-1.

The RAID encoder 214-1 can update the PDB to conform to new UDB received as part of a write command from the host. To update the PDB, an old UDB (that is to be replaced with the new UDB) and an old PDB (of a same stripe as the old UDB) can be read (e.g., transferred to the RAID encoder 214-1) and compared (e.g., XORed) with the new UDB, and a result of the comparison (e.g., the XOR operation) can be further compared (e.g., XORed) with an old PDB (that is to be updated) to result in a new (e.g., updated) PDB.

As shown in FIG. 2A, the central controller portion 210 can include ECC encoders 216-1-1, . . . , 216-1-X. The data transferred to each ECC encoder 216-1 can be in cypher text form as the data were previously encrypted at the security encoder 217-1. Each ECC encoder 216-1 can be responsible for a respective region of the memory devices 226, such as a set of memory dice (e.g., the memory dice 327-1, . . . , 327-4 illustrated in FIG. 3), although embodiments are not so limited. For example, each ECC encoder 216-1 can operate based on input data (one or more UDBs) corresponding to a cache line.

Each ECC encoder 216-1 can be configured to generate ECC data (alternatively referred to as "error correction information") based collectively on data (e.g., UDBs corresponding to a cache line) transferred from the RAID encoder 214-1. The ECC data can include parity data.

The parity data can be generated (at the ECC encoder 216-1) based on an encoding matrix (alternatively referred to as "parity matrix"). As further illustrated and described in association with FIG. 6, the parity matrix can include a number of bit patterns (e.g., rows of the matrix) each corresponding to a respective bit position of bits of one or more UDBs (e.g., UDBs corresponding to a cache line). The ECC encoders 216-1 can perform one or more XOR operations among one or more bit patterns of the parity matrix respectively corresponding to one or more bit positions (of the UDBs corresponding to a cache line) associated with a particular bit value (e.g., "1"). For example, if the UDBs (corresponding to a cache line) input (e.g., transferred) to the ECC encoder 216-1 includes a first and third bits having a binary value of "1", the ECC encoder 216-1 can perform an XOR operation between a bit pattern corresponding to the first bit and a bit pattern corresponding to the third bit and a result can be further transferred to the memory devices 226 as parity (ECC) data.

Each ECC encoder 216-1 can be paired with a respective one of ECC decoders 216-2-1, . . . , 216-2-X to operate in a collective manner and to be dedicated for each memory device 226 and/or each memory die of the memory devices 226. For example, an ECC encoder 216-1-1 that is responsible for one memory die of the memory device 226-1 can be grouped with an ECC decoder 216-2-1 that is also responsible for the memory die, which allows ECC data that were generated at the ECC encoder 216-1-1 to be later transferred to (e.g., stored in) the ECC decoder 216-2-1 for performing an error correction operation on data (e.g., a portion of MTB) stored in the memory die.

"Extra" bits of data (alternatively referred to as "auxiliary data") can be transferred (along with the UDBs) to the back end portion 219 to be ultimately transferred and written to the memory devices 226. The "extra" bits can include RAID parity data (e.g., in forms of a PDB) generated at the RAID 214-1, error detection information (e.g., CRC data) generated at the FCRC encoder 211-1 and/or 213-1, error correction information (e.g., alternatively referred to as ECC data) generated at the ECC encoders 216-1, and/or authentication data (e.g., MAC data) generated at the authenticity/integrity check encoder 218-1 that are associated with the UDBs as well as metadata and/or TEE data.

As shown in FIG. 2A, the memory controller 200 can include a back end portion 219 coupled to the central controller portion 210. The back end portion 219 can include media controllers 221-1, . . . , 221-N. The back end portion 219 can include PHY memory interfaces 224-1, . . . , 224-N. Each physical interface 224 is configured to be coupled to a respective memory device 226.

The media controllers 221-1, . . . , 221-N can be used substantially simultaneously to drive the channels 225-1, . . . , 225-N simultaneously. In at least one embodiment, each of the media controllers 221 can receive a same command and address and drive the channels 225 substantially simultaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The channels 225 can include a number of separate data protection channels (alternatively referred to as RAS (Reliability, Availability, and Serviceability) channel), which can each comprise a number of memory devices (e.g., dice) 226 accessed together in association with a particular data protection scheme (e.g., RAID, LPCK, etc.). The data protection channels can include RAID (e.g., locked-RAID) channels. In a RAID process that is "locked", all the subsets corresponding to a RAID stipe are collectively accessed together regardless of whether a corresponding RAID process is triggered or not. For example, the subsets can be collectively accessed together even in response to a mere host read request for accessing a portion (e.g., one) of the subsets, which makes a RAID process readily available without incurring an additional/separate access to the other subsets. As used herein, the term "RAID channel" refers to one or more channels (e.g., channels 125 and/or 225 illustrated in FIGS. 1 and 2, respectively) that are accessed together for RAID access. Alternatively speaking, a RAID channel can be an access unit for transfer of a single RAID stripe. For example, the channels 225 can be organized as a number of RAID channels with each RAID channel comprising a particular quantity of channels 225.

The PHY memory interfaces 224 can be an LPDDRx memory interface. In some embodiments, each of the PHY memory interfaces 224 can include data and DMI pins. For example, each PHY memory interface 224 can include twenty data pins (DQ pins) and five DMI pins. The media controllers 221 can be configured to exchange data with a respective memory device 226 via the data pins. The media controllers 221 can be configured to exchange error correction information (e.g., ECC data), error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged simultaneously with the error correction information and/or the error detection information. For example, 128 bytes of data (e.g., UDBs corresponding to a cache line) can be exchanged (transmitted or received) via the data pins while 128 bits of the extra bits are exchanged via the DMI pins. Such embodiments reduce what would otherwise be overhead on the data input/output (e.g., also referred to in the art as a "DQ") bus for transferring error correction information, error detection information, and/or metadata.

The back end portion 219 can couple the PHY memory interfaces 224-1, . . . , 224-N to respective memory devices 226-1, . . . , 226-N. The memory devices 226 each include at least one array of memory cells. In some embodiments, the memory devices 226 can be different types of memory. The media controllers 221 can be configured to control at least two different types of memory. For example, the memory device 226-1 can be LPDDRx memory operated according to a first protocol and the memory device 226-N can be LPDDRx memory operated according to a second protocol different from the first protocol. In such an example, the first media controller 221-1 can be configured to control a first subset of the memory devices 226-1 according to the first protocol and the second media controller 221-N can be configured to control a second subset of the memory devices 226-N according to the second protocol.

Data (UDBs corresponding to a cache line) stored in the memory devices 226 can be transferred to the back end portion 219 to be ultimately transferred and written to the cache 212 and/or transferred to the host (e.g., the host 103 illustrated in FIG. 1). In some embodiments, the data are transferred in response to a read command to access a subset of the data (e.g., one UDB) and/or to synchronize the cache 212 and the memory devices 226 to clean up "dirty" data in the cache 212.

Along with the UDBs, other "extra" bits of data (alternatively referred to as "auxiliary data") can be transferred to the back end portion 219 as well. The "extra" bits can include CRC data generated at the FCRC encoder 211-1 and/or 213-1, ECC data generated at the ECC encoders 216-1, and authentication data generated at the authenticity/integrity check encoder 218-1 that are associated with the UDBs as well as metadata and/or TEE data. As described herein, the UDBs transferred to the back end portion 219 can be in cypher text form.

Data (e.g., UDBs corresponding to a cache line) transferred to the back end portion 219 can be further transferred to the respective ECC decoders 216-2. At each ECC decoder 216-2, an error correction operation can be performed on the data to correct error(s) up to a particular quantity and/or detect errors beyond particular quantity without correcting those. In one example, each ECC decoder 216-2 can use the error correction information (e.g., ECC data) to correct a single error without detecting two or more errors, which is referred to as a single error correction (SEC) operation. In another example, each ECC decoder 216-2 can use the error correction information (e.g., ECC data) to either correct a single error or detect two errors (without correcting two errors), which is referred to as a single error correction and double error detection (SECDED) operation. In a different example, each ECC decoder 216-2 can use the error correction information to either correct a two error or detect three errors (without correcting three errors), which is referred to as a double error correction and triple error detection (DECTED) operation.

The ECC decoders 216-2 can perform an error correction operation using a decoding matrix (alternatively referred to as "parity check matrix). As further illustrated and described in association with FIG. 6, the parity check matrix can include a number of bit patterns (e.g., rows of the matrix) each corresponding to a respective bit position of bits of one or more UDBs (e.g., UDBs corresponding to a cache line) as well as corresponding parity data previously generated at the ECC encoder 216-1. For example, if the UDBs (corresponding to a cache line) and the corresponding parity data transferred from one or more memory devices 226 to the ECC decoder 216-2 include a first and third bits (that respectively correspond to first and third bit positions) having a binary value of "1", the ECC decoder 216-2 can generate parity data by performing an XOR operation between a bit pattern (of the parity check matrix) corresponding to the first bit and a bit pattern (of the parity check matrix) corresponding to the third bit. Continuing with this example, the ECC decoder 216-2 can further perform an XOR operation between the parity data generated based on the data transferred from the memory devices 226 and the parity data previously generated at the ECC encoder 216-1 and transferred from the memory devices 226. If a result (alternatively referred to as "syndrome") of the XOR operation between these two sets of parity data is zero syndrome (e.g., all bits of the syndrome being "0"), which indicates that there is no error within the UDBs, the UDBs can be further transferred to the CRC decoder 213-2 without performing an error correction operation. If the resulting syndrome matches to one of the bit patterns of the decoding matrix, which indicates that the UDBs has an error in a respective bit position corresponding to the matched bit pattern, the ECC decoder 216-2 can correct the error, for example, by flipping a bit of the bit position indicated by the resulting syndrome. If the resulting syndrome is not zero and does not match to one of the bit patterns of the decoding matrix, which indicates that the UDBs has errors whose quantity is not correctable by the ECC decoder 216-2, the UDBs (as well as the parity data transferred from the memory devices 226) can be transferred to the CRC decoder 213-2 without the errors being corrected.

As described herein, each ECC decoder 216-2 can also be responsible for a respective memory device 226 as the paired ECC encoder 216-1 is. the ECC decoder 216-2 (e.g., each ECC decoder 216-2) can be configured to perform an error correction operation on data (e.g., UDBs) transferred from a respective set of memory dice (that correspond to a cache line) using the ECC data. In some embodiments, pairs of ECC encoder/decoder 216 can be selectively enabled/disabled to transfer data between the memory devices 226 and the memory controller 200 without generating error correction information (e.g., ECC data) and/or performing an error correction operation using the pairs.

Subsequent to error correction operations performed respectively at the ECC decoders 2162, the UDBs corresponding to a cache line can be further transferred to the CRC decoder 213-2 along with at least the error detection information previously generated at the CRC encoder 213-1. At the CRC decoder 213-2, an error detection operation can be performed to detect any errors in the UDBs using the error detection information, such as CRC data.

The CRC decoder 213-2 can operate on data in conjunction with the RAID decoder 214-2 to provide check-and-recover correction. More specifically, the CRC decoder 213-2 can detect an error in data (e.g., received from the respective ECC decoder 216-2) and the RAID decoder 214-2 can recover the data in response. In at least one embodiment, the check-and-recover correction provided by the error detection circuitry 211 and the RAID decoder 214-2 is supplemental to the error correction provided by the ECC decoder 216-2. For example, if data (e.g., UDBs corresponding to a cache line) transferred from the memory devices 226 has an error correctable by the ECC decoder 216-2, it can do so without further data recovery (e.g., one or more RAID operations) by the RAID decoder 214-2.

However, if an error persists that is not correctable by the ECC decoder 216-2, then the data may be recoverable by the RAID decoder 214-2. As another example, an error may escape detection by the ECC decoder 216-2, but be detected by the CRC decoder 213-2. In such an example, the underlying data may be recoverable by the RAID decoder 214-2.

When the RAID process is triggered, the RAID operation performed on the UDB (e.g., corresponding to a cache line) can recover a subset of the UDB that was transferred from one (e.g., failed) memory die based on the other subsets of the UDB transferred from the other memory dice. Since all the subsets (of the UDB) is collectively input (e.g., transferred) to the CRC decoder (e.g., the CRC decoder 213-2 illustrated in FIG. 2A) and collectively checked for one or more errors (alternatively referred to as "locked-RAID"), the CRC check performed at the CRC decoder may not indicate which subset has one or more errors. Therefore, the triggered RAID process involves a number of RAID operations that can be respectively and independently performed on each subset to correct the one subset that indeed has the errors. For example, considering an UDB is received from four memory dice (e.g., the memory dice 327-1, . . . , 327-4 illustrated in FIG. 3), four RAID operations can be performed (e.g., in parallel or in a particular sequence) independent and respectively on each subset (corresponding to each memory dice) of the UDBs.

The RAID decoder 214-2 can further include an ECC decoder 220, which can provide the same functionality as the ECC decoder 216-2. For example, the ECC decoder 220 can be configured to perform an error correction operation on data (e.g., UDBs corresponding to a cache line) transferred from the CRC decoder 213-2. The ECC decoder 220 can operate in conjunction with a RAID process to correct any residual errors on the UDBs. For example, an amount of errors caused from the RAID process, but is correctable using the respective ECC data can be corrected at the ECC decoder 220.

In some embodiments, the RAID decoder 214-2 can further include a CRC decoder 215 that provides the same functionality as the CRC decoder 213-2, but to perform an error detection operation (e.g., to CRC-check) on data (e.g., UDBs corresponding to a cache line) subsequent to the RAID operations and/or the error correction operations performed by the ECC decoder 220. Continuing with the above example, the CRC check can be performed using the CRC decoder within the RAID decoder 214-2 on results of the four RAID operations to determine which one of the RAID operations actually recovered the UDBs. One of the results (e.g., UDB with the errors corrected properly) can be further sent to the security decoder 217 and/or authentication decoder 218.

The data (e.g., UDBs corresponding to a cache line) can be further transferred to the security decoder 217-2 and to the authenticity/integrity check decoder 218-2 (shown as "AUTHENTICATION DEC" 218-2 in FIG. 2A) along with at least the authentication data previously generated at the authenticity/integrity check encoder 218-1. At the security decoder 217-2, the data can be decrypted (e.g., converted from the cypher text back to the plain text as originally received from the host). The security decoder 217-2 can use an AES decryption to decrypt the data.

At the authenticity/integrity check decoder 218-2, the data that were decrypted at the security decoder 217-2 can be authenticated (and/or checked for data integrity) using the authentication data (e.g., MAC data) that were previously generated at the authenticity/integrity check encoder 218-1. In some embodiments, the authenticity/integrity check decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is written to the cache 212 (and further transferred to the host if needed). If the calculated MAC and transferred MAC do not match, the host is notified of the mismatch (and/or the poison).

The data (e.g., UDBs corresponding to a cache line) authenticated (and/or checked for data integrity) at the authenticity/integrity check decoder 218-2 can be transferred and written to the cache 212. In some embodiments, data can be further transferred from the cache 212 to the FCRC decoder 211-2, for example, in response to a read command received from the host (e.g., the host 103 illustrated in FIG. 1). As described herein, host read and write commands of CXL memory systems can be a size of UDB, such as 64 bytes. For example, data can be requested by the host in a granularity of an UDB. In this example, even if data transferred from the memory devices 226 are multiple UDBs (corresponding to a cache line), data can be transferred from the cache 212 to the host in a granularity of an UDB. At the FCRC decoder 211-2, data (e.g., an UDB requested by the host) can be checked (CRC-checked) for any errors using CRC data that were previously generated at the FCRC encoder 211-1. The data decrypted at the FCRC decoder 211-2 can be further transferred to the host.

Figure 2B:
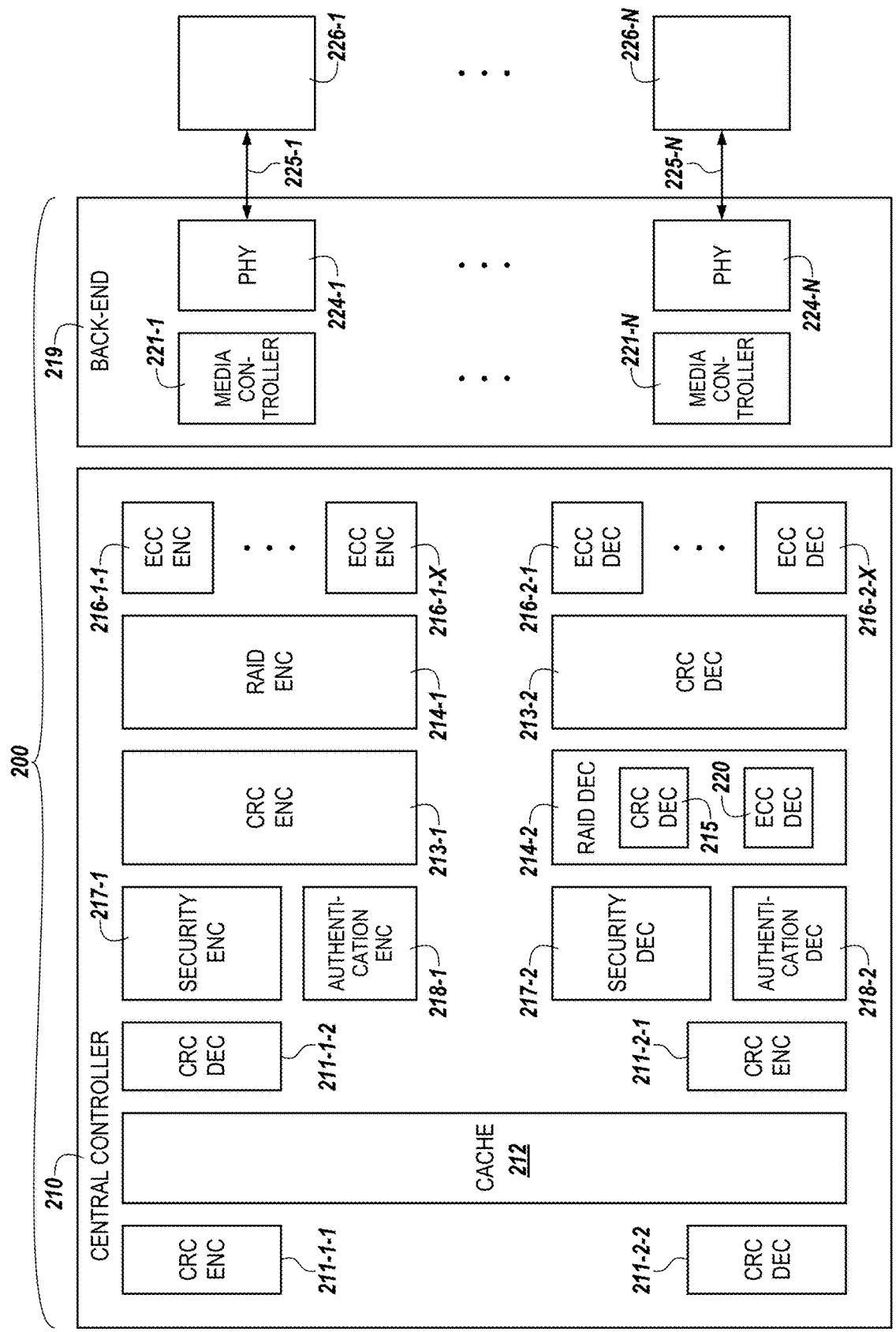
FIG. 2B is another functional block diagram of a memory controller having a RAID encoder/decoder in accordance with a number of embodiments of the present disclosure.

FIG. 2B is another functional block diagram of a memory controller 200 for cache line data protection in accordance with a number of embodiments of the present disclosure. The memory controller 200, the central controller portion 210, the back end portion 219, and the memory devices 226 illustrated in FIG. 2B are analogous to the memory controller 100, the central controller portion 110, the back end portion 119, and the memory devices 126 illustrated in FIG. 1.

The memory controller 200 can include a central controller portion 210, and a back end portion 219. The central controller portion 210 can include a front-end CRC ("FCRC") encoder 211-1-1 paired with a FCRC decoder 211-2 and a FCRC encoder 211-2-1 paired with a FCRC decoder 211-2-1, the cache memory 212 coupled between the paired CRC encoder/decoder 211-1 and CRC encoder/decoder 211-2, the security encoder 217-1 paired with the security decoder 217-2, the authenticity/integrity check encoder 218-1 (shown as "AUTHENTICATION ENC" 218-1 in FIG. 2B) paired with the authenticity/integrity check decoder 218-2 (shown as "AUTHENTICATION DEC" 218-2 in FIG. 2B), the CRC encoder 213-1 paired with the CRC decoder 213-2, the RAID encoder 214-1 paired with the RAID decoder 214-2, and the ECC encoders 216-1-1, . . . , 216-1-X respectively paired with the ECC decoders 216-2-1, . . . , 216-2-X. A pair of security encoder/decoder 217, a pair of authenticity/integrity check encoder/decoder 218, a pair of CRC encoder/decoder 213, a pair of RAID 214, respective pairs of ECC encoder/decoder 216 can be analogous to a pair of security encoder/decoder 217, a pair of authenticity/integrity check encoder/decoder 218, a pair of CRC encoder/decoder 213, a pair of RAID encoder/decoder 214, respective pairs of ECC encoder/decoder 216, as illustrated in FIG. 2A. Although not illustrated in FIG. 2B, the RAID decoder 214-2 can further include a CRC decoder that provides the same functionality as the CRC decoder 213-2, but to perform an error detection operation (e.g., to CRC-check) on data subsequent to the RAID process. The back end portion 219 can include media controllers 221-1, . . . , 221-N and PHY memory interfaces 224-1, . . . , 224-N configured to be coupled to memory devices 226-1, . . . , 226-N via channels 225-1, . . . , 225-N.

FIG. 2B is analogous to FIG. 2A, except that it includes additional circuitry to check any errors on the UDB using CRC data without transferring/storing the CRC to the memory device 226. For example, as illustrated in FIG. 2B, the FCRC decoder 211-1-2 coupled between the cache 212 and the security encoder 217-1 (and/or the authenticity/integrity check encoder 218-1) can be configured to check any errors on an UDB stored in the cache 212 using error detection information (e.g., CRC data) generated at the FCRC encoder 211-1-1. The FCRC encoder 211-2-1 coupled between the cache 212 and the security decoder 217-2 (and/or the authenticity/integrity check decoder 218-2) can be configured generate error detection information (e.g., CRC data) on an UDB to be transferred to the host (e.g., the host 103 illustrated in FIG. 1). The error detection information generated at the FCRC encoder 211-2-1 can be used at the FCRC decoder 211-2-2 to check any errors on an UDB transferred from the cache 212.

In some embodiments, the pairs of CRC encoder/decoder 211-1 and 211-2 can be used just to check errors on data stored in the cache. Accordingly, error detection information (e.g., CRC data) used at the pairs 211-1 and 211-2 may not be transferred and written to the memory devices 226.

Figure 3:
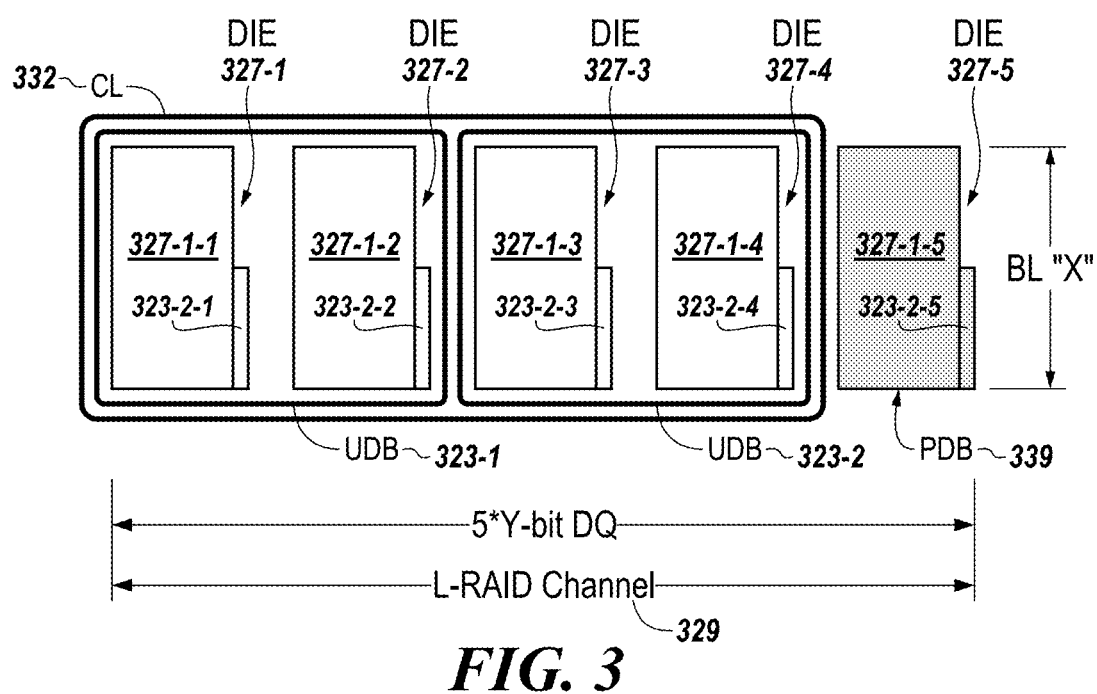
FIG. 3 is a block diagram of memory dice corresponding to a data protection channel in accordance with a number of embodiments of the present disclosure.

FIG. 3 is a block diagram of memory dice corresponding to a number of data protection channels (e.g., RAID channels) in accordance with a number of embodiments of the present disclosure. The diagram illustrates five memory dice 327-1, . . . , 327-5, which can collectively correspond to a RAID (e.g., locked-RAID) channel 329, while four memory dice 327-1, . . . , 327-4 of those correspond to a cache line 332.

Each memory dies 327 can include separate portions having different types of data pins, such as DQ pins and DMI pins. For example, a first portion 327-1-1, 327-2-1, 327-3-1, 327-4-1, 327-5-1 of each memory die 327 can include DQ pins via which data can be transferred. Further, a second portion 327-1-2, 327-2-2, 327-3-2, 327-4-2, 327-5-2 of each memory die 327 can include DMI pins via which data can be transferred.

Data can be transferred to or from the memory die 327 over a predefined burst length, such as over X-bit burst length. Further, data can be transferred at a rate of Y bits to or from the respective first portion 327-1-1, 327-2-1, 327-3-1, 327-4-1, 327-5-1 per beat and at a rate of Z bit(s) to or from the respective second portion 327-2. In one example, 32 bytes of data can be transferred to or from each first portion 327-1-1, 327-2-1, 327-3-1, 327-4-1, 327-5-1 over the 32-bit burst length at a rate of 8 bits per beat, while 16 bits of data can be transferred to or from each second portion 327-1-2, 327-2-2, 327-3-2, 327-4-2, 327-5-2 over the 32-bit burst length at a rate of 1 bit per beat.

Although embodiments are not so limited, two memory dice 327 can correspond to (e.g., a channel width) of the channel 125 and/or 225 illustrated in FIGS. 1 and 2, respectively. For example, memory dice 327-1 and 327-2 can correspond to one channel 125, 225; memory dice 327-3 and 327-4 can correspond to another channel 125, 225; and memory die 327-5 can correspond to (a half of) a different channel 125, 225. Accordingly, each channel 125, 225 can be 2*Y-bit wide (e.g., 16-bit wide).

The memory dice 327-1, . . . , 327-5 can correspond to a same memory rank of memory device (e.g., the memory devices 126 and/or 226 illustrated in FIGS. 1 and 2). As used herein, the term "memory ranks" generally refers to a plurality of memory chips (e.g., memory dice) that can be accessed simultaneously. Accordingly, memory dice 327-1, . . . , 327-5 can be accessed simultaneously (e.g., "substantially simultaneously" as defined herein).

The diagram shows four memory dice 327-1, . . . , 327-4 (of RAID channel 329) over which data corresponding to a cache line 332 (e.g., UDBs 323-1 and 323-2) can be stored, although embodiments are not limited to a particular quantity of memory dice over which a single UDB can be stored. In a particular example, an UDB 323-1 of 64 bytes can be stored over two memory dice 327-1 and 327-2 and an UDB 323-2 of 64 bytes can be stored over two memory dice 327-3 and 327-4. Although embodiments are not so limited, the UDBs 323 can be stored in the respective first portions 327-1-1, 327-2-1, 327-3-1, 327-4-1 of the memory dice.

Further, auxiliary data can be stored over the respective second portions 327-1-2, 327-2-2, 327-3-2, 327-4-2 of the memory dice 327-1, . . . , 327-4. In a particular example, each second portion 327-1-2, 327-2-2, 327-3-2, 327-4-2 can be configured to store 16 bytes of auxiliary data (4 bytes for each memory die 327). The auxiliary data (e.g., 64 bits of auxiliary data) can include authentication data (e.g., 28 bits of MAC generated at the authenticity/integrity check encoder 218-1 illustrated in FIG. 2), error detection data (e.g., 17 bits of CRC generated at the CRC encoder 213-1), error correction data (e.g., 12 bits of ECC data), (e.g., 1 bit of) TEE data, and metadata (6 bits in total with 3 bits for each UDB 323). The diagram further shows a memory die 327-5, in which a PDB 339 including RAID parity data can be stored, although embodiments are not limited to a particular quantity of memory dice over which a PDB can be stored.

The memory dice 327-1, . . . , 327-5 can correspond to a data protection channel, such as a RAID (e.g., locked-RAID) channel 329; therefore, the RAID channel 329 can be 5*Y-bit wide (e.g., configured to provide 5*Y bits, such as 40 bits, via DQ pins). Data stored in the memory dice 327-1, . . . , 327-5 can also be a data transfer unit between the memory device (e.g., the memory device 126 and/or 226 illustrated in FIGS. 1 and 2) and the memory controller (e.g., the memory controller 100 and/or 200 illustrated in FIGS. 1 and 2). For example, UDBs 323-1 and 323-2 as well as auxiliary data and an PDB 339 can be transferred together in response to a host read command to access the UDB 323-1 and/or 323-2. Although not specifically illustrated in FIG. 3, the memory system (e.g., the memory system 101) can include a number of RAID channels, such as four RAID channels (e.g., each corresponding to the RAID channel 329), for example.

Figure 4:
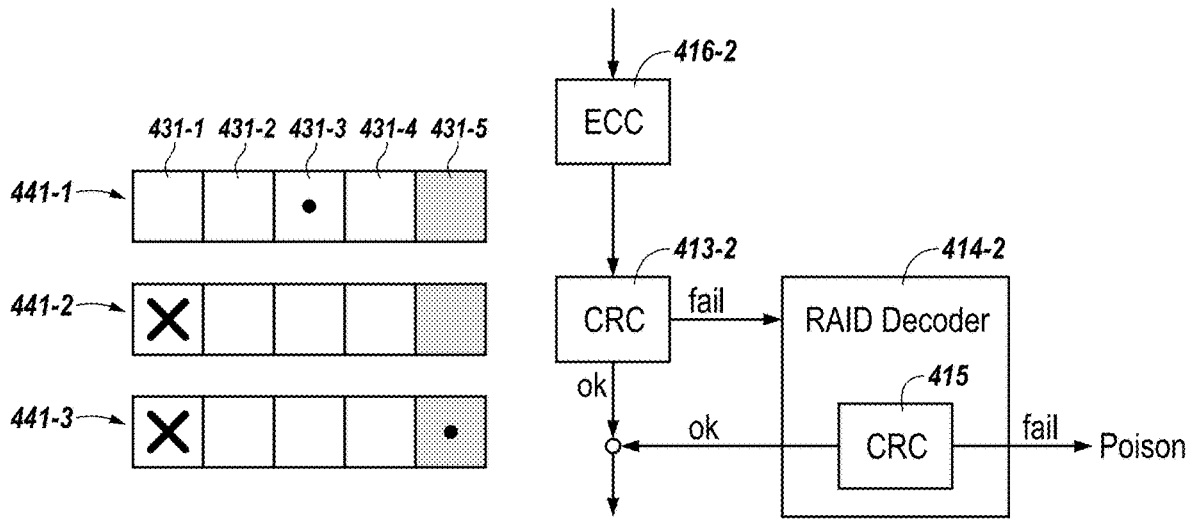
FIG. 4 is a block diagram schematically illustrating how to operate a RAID decoder in conjunction with error correction code (ECC) decoder and CRC decoder in accordance with a number of embodiments of the present disclosure.

FIG. 4 is a block diagram schematically illustrating how to operate a RAID decoder 414-2 in conjunction with ECC decoder 416-2 and CRC decoder 413-2 in accordance with a number of embodiments of the present disclosure. The RAID decoder 414-2, ECC decoder 416-2, CRC decoder 413-2, and CRC decoder 415 are respectively analogous to the RAID decoder 214-2, ECC decoder 216-2, CRC decoder 213-2, and CRC decoder 214 illustrated in FIGS. 2A and/or 2B.

Subsets of data 431-1, . . . , 431-5 can be respectively analogous to data transferred from memory dice 327-1, . . . , 327-5 of a RAID channel (e.g., RAID channel 329 illustrated in FIG. 3). For example, the subsets 431-1 and 431-2 can correspond to one UDB (e.g., the UDB 323-1 illustrated in FIG. 3), the subsets 431-3 and 431-4 can correspond to another UDB (e.g., the UDB 323-2 illustrated in FIG. 3), and the subset 431-5 can correspond to a PDB (e.g., the PDB 339 illustrated in FIG. 3). As used herein, each subset of a RAID channel can be a unit of RAID protection scheme. For example, a RAID process of the RAID protection scheme, when triggered, can recover at least data corresponding to a single subset.

When the subsets 431 corresponding to the RAID channel are transferred from the memory dice 327 (of the memory devices 126 and/or 226 illustrated in FIGS. 1, 2A, and/or 2B, respectively) to the memory controller 200, the subsets 431 are input (e.g., transferred) to the ECC decoder 416-2, at which one or more bit errors of the subsets are corrected. For example, if parity data generated at the ECC encoder (e.g., the ECC encoder 216-1 illustrated in FIGS. 2A and/or 2B) has a SEC capability, the ECC decoder 416-2 is capable of correcting a single bit-error within the subsets 431-1, . . . , 431-4.

The subsets 431 can be subsequently input to the CRC decoder 413-2, at which it is determined and/or indicated whether the subsets 431-1, . . . , 431-4 include one or more errors that were not corrected at the ECC decoder 416-2. If so, the subsets are input to the RAID decoder 414-2 to trigger a RAID process, which may correct the one or more errors indicated at the CRC decoder 413-2. If not (if the one or more errors were not detected and/or indicated at the CRC decoder 413-2), the RAID process may not be triggered and bypassed.

When the RAID process is triggered, a RAID operation (e.g., a locked-RAID operation) is performed on the subsets 431-1, . . . , 431-4 using RAID parity of the subset 431-5. Further details of the locked-RAID operation performed at the RAID decoder 414-2 are described in association with FIGS. 7 and 8. Subsequent to the RAID operation, the subsets 431-1, . . . , 431-5 are input to the CRC decoder 415, which can indicate whether there is one or more bit errors remaining in the subsets 431-1, . . . , 431-5. If the CRC decoder 415 still indicates the one or more bit errors, the memory controller (e.g., the memory controller 100 and/or 200 illustrated in FIG. 1, 2A and/or 2B, respectively) reports the CRC check failure (e.g., "poison") to the host (e.g., the host 103 illustrated in FIG. 1). If not (if the CRC decoder 415 does not indicate an error in the subsets 431-1, . . . , 431-5), the subsets 431-1, . . . , 431-4 can be further transferred to a subsequent component (e.g., the security decoder 217-2) of the memory controller.

FIG. 4 illustrates three different scenarios 441-1, 441-2, and 441-3. In an example scenario 441-1, the subsets 431-1, . . . , 431-5 includes a single bit error in the subset 431-3; in an example scenario 441-2, the subsets 431-1, . . . , 431-5 includes more than a single bit error in the subset 431-1; and in an example scenario 441-2, the subsets 431-1, . . . , 431-5 includes more than a single bit error in the subset 431-1 and a single bit error in the subset 431-5. Although embodiments are not so limited, bit errors in the subsets 431-1 of 441-2 and 441-3 may have caused from a die failure (e.g., of the memory die 327-1).

The single bit error in the subset 431-3 of 441-1 can be corrected at the ECC decoder 416-2 and prior to being input to the CRC decoder 413-2; therefore, the CRC decoder 413-2 may not indicate any errors in the subsets 431-1, . . . , 431-5, which further leads to the bypass of the RAID process that would have been performed at the RAID decoder 414-2.

Although the errors in the subset 431-1 of 441-2 are not correctable at the ECC 416-2, the CRC decoder 413-2 can indicate that the errors were not corrected at the ECC decoder 416-2, which triggers the RAID process at the RAID decoder 414-2. Because the RAID decoder 414-2 is capable of correcting and/or recovering any quantity of errors in one subset, data corresponding to the subset 431-1 can be recovered and the CRC decoder 415 (to which the subsets 431-1, . . . , 431-5 are subsequently input) indicates no errors in the subsets 431-1, . . . , 431-4 and the subsets 431-1, . . . , 431-4 can be subsequently transferred to the security decoder 217-2.

Figure 5:
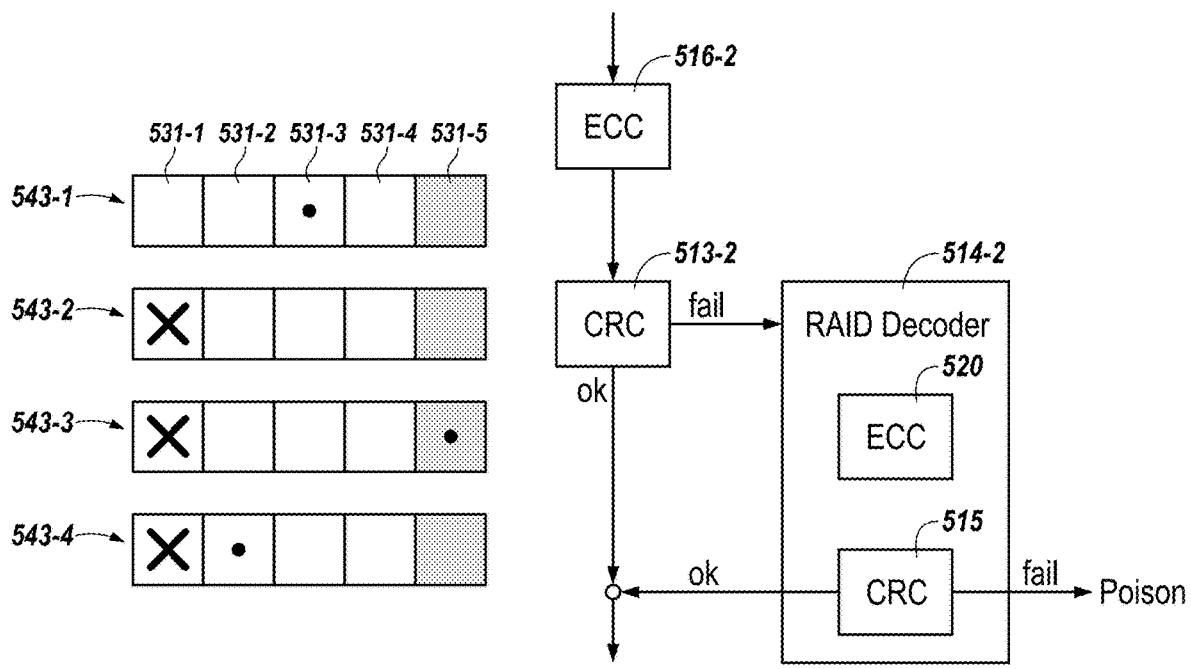
FIG. 5 is a block diagram schematically illustrating how to operate a RAID decoder in conjunction with ECC decoder and CRC decoder in accordance with a number of embodiments of the present disclosure.

FIG. 5 is a block diagram schematically illustrating how to operate a RAID decoder 514-2 in conjunction with ECC decoder 516-2 and CRC decoder 513-2 in accordance with a number of embodiments of the present disclosure. The RAID decoder 514-2, ECC decoder 516-2, CRC decoder 513-2, CRC decoder 515, and ECC decoder 520 are respectively analogous to the RAID decoder 214-2, ECC decoder 216-2, CRC decoder 213-2, CRC decoder 214, and ECC decoder 220 illustrated in FIGS. 2A and/or 2B.

Further, subsets of data 531-1, . . . , 531-5 can be respectively analogous to data transferred from memory dice 327-1, . . . , 327-5 of a RAID channel (e.g., RAID channel 329 illustrated in FIG. 3). For example, the subsets 531-1 and 531-2 can correspond to one UDB (e.g., the UDB 323-1 illustrated in FIG. 3), the subsets 531-3 and 531-4 can correspond to another UDB (e.g., the UDB 323-2 illustrated in FIG. 3), and the subset 531-5 can correspond to a PDB (e.g., the PDB 339 illustrated in FIG. 3).

FIG. 5 illustrates four different scenarios 543-1, 543-2, 543-3, and 543-4. In an example scenario 543-1, the subsets 531-1, . . . , 531-5 includes a single bit error in the subset 531-3; in an example scenario 543-2, the subsets 531-1, . . . , 531-5 includes more than a single bit error in the subset 531-1; in an example scenario 543-2, the subsets 531-1, . . . , 531-5 includes more than a single bit error in the subset 531-1 and a single bit error in the subset 531-5 (corresponding to a PDB, such as PDB 339 illustrated in FIG. 3); and, an example scenario 543-4, the subsets 531-1, . . . , 531-5 includes more than a single bit error in the subset 531-1 and a single bit error in the subset 531-2. Although embodiments are not so limited, bit errors in the subsets 531-1 of 543-2, 543-3, and 543-4 may have caused from a die failure (e.g., of the memory die 327-1).

FIG. 5 is analogous to FIG. 4 except that the RAID decoder 514-2 includes the ECC decoder 520, which operates prior to the subsets 531-1, . . . , 531-5 being input to the CRC decoder 214. For example, subsequent to the RAID operation (e.g., locked-RAID operation) performed at the RAID decoder 514-2, the subsets 531-1, . . . , 531-5 are input to the ECC decoder 520, which can correct a quantity of bit errors (e.g., a single bit error) in the subsets 531-1, . . . , 531-4 prior to being checked for any remaining errors at the CRC decoder 214.

Unlike the subset 431-1 in 441-3 was not recoverable when a RAID operation was performed using a PDB of the subset 431-5 having one or more errors, the subset 531-1 in 543-3 can be recovered even using a PDB of the subset 531-5 that may include one or more bit errors (e.g., a single bit error). For example, a RAID operation performed using the PDB may recover the subset 531-1, but with the one ore more bit errors (e.g., a same quantity of bit errors as included in the PDB of the subset 531-5). In some embodiments, these one or more bit errors of the recovered subset 531-1 can be corrected by the ECC decoder 520 (if the ECC decoder 520 is capable of correcting the errors), which can lead to the CRC decoder 515 indicating no errors in the subsets 531-1, . . . , 531-4.

In contrast, the RAID operation performed using the subsets 531-2, 531-5 with one or more bit errors within one of the subsets 531-2, . . . , 531-4 (e.g., in the subset 531-2 as illustrated in FIG. 5) may not always properly reconstruct/recover the subset 531-1, which may indeed have an amount of bit errors that may not be correctable using the ECC decoder 520. Therefore, in this event, the CRC decoder 515 might indicate an error in the subsets 531-1, . . . , 531-4 even subsequent to the ECC decoder 520.

Figure 6:
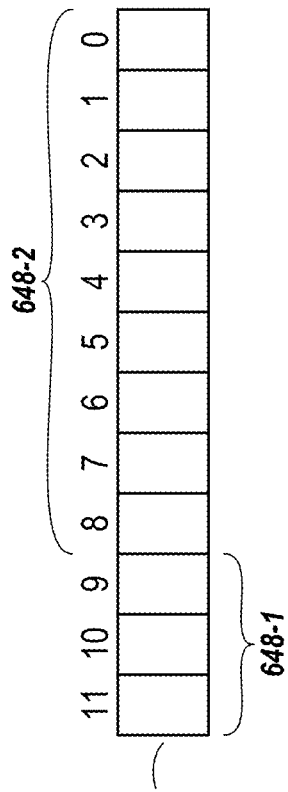
FIG. 6 schematically illustrates a parity matrix, a parity check matrix, and an example row of the parity matrix and/or the parity check matrix in accordance with a number of embodiments of the present disclosure.

FIG. 6 schematically illustrates a parity matrix 642, a parity check matrix 644, and an example row 648 of the parity matrix 642 and/or the parity check matrix 644 in accordance with a number of embodiments of the present disclosure. The parity matrix 642 can be an encoding matrix the ECC encoders 216-1-1, . . . , 216-1-X utilize to generate parity data for error correction operation. The parity matrix 642 can include rows, such as a number of rows 642-1, 642-2, 642-3, and 642-4, which can respectively correspond to a number of memory dice (e.g., the memory dice 327-1, 327-2, 327-3, and 327-4 illustrated in FIG. 3). For example, the number of rows 642-1 can respectively correspond to (e.g., can be respectively assigned to) a number of bits of a RAID stripe to be stored in the memory die 327-1; the number of rows 642-2 can respectively correspond to a number of bits of the RAID stripe to be stored in the memory die 327-2; the number of rows 642-3 can respectively correspond to a number of bits of the RAID stripe to be stored in the memory die 327-3; and the number of rows 642-4 can respectively correspond to a number of bits of the RAID stripe to be stored in the memory die 327-4.

The parity check matrix 644 can be a decoding matrix the ECC decoders 216-2-1, . . . , 216-2-X utilize to perform the error correction operation. In addition to the rows 642 included in the parity matrix 642, the parity check matrix 644 can further include a number of rows 645, which can respectively correspond to a number of parity bits. For example, if the parity bits generated at the ECC encoders 216-1 are 12 bits, the number of rows 645 of the parity check matrix 644 can include 12 rows as well.

The example row 648 illustrated in FIG. 6 can be one of the rows (e.g., the number of rows 642-1, . . . , 642-4 and/or 645) of the parity matrix 642 and/or the parity check matrix 644. A first portion 648-1 of the row 648 can be assigned one of (e.g., four) different bit patterns that can be used to identify a die (among dice corresponding to a cache line) that a respective bit corresponding to the row 648 further corresponds to (e.g., is transferred from). For example, if parity data generated based on the parity matrix 642 are designed to protect one or more UDBs that are stored over four different memory dice, the first portion can be assigned four different bit patterns, such as "011" (for die 0), "110" (for die 1), "101" (for die 2), and "111" (for die 3) that respectively indicate four memory dice.

As illustrated herein, the parity data generated based on the parity matrix 642 may not be capable of detecting two or more bit errors, while is capable of correcting a single bit error. When an error correction operation is performed using the parity check matrix 644, two or more bit errors over multiple memory dice may indeed indicate a bit position of a different memory die (that indeed may not have one or more bit errors) as having a bit error. For example, as illustrated in Table 1, two bit errors on memory dice 0 and 1 may cause the error correction operation to falsely indicate the memory die 2 as having a bit error (as a result of XORing between "011" and "110" being "101"); two bit errors on memory dice 0 and 2 may cause the error correction operation to falsely indicate the memory die 1 as having a bit error (as a result of XORing between "011" and "101" being "110"); and two bit errors on memory dice 1 and 2 may cause the error correction operation to falsely indicate the memory die 0 as having a bit error (as a result of XORing between "110" and "101" being "011").

TABLE 1

Error Interaction Table

|   | 0 | 1 | 2 | 3 |
|---|---|---|---|---|
| 0 |   |   | 2 | 1 |
| 1 | 2 |   |   | 0 |
| 2 | 1 |   | 0 |   |
| 3 |   |   |   |   |

A second portion 648-2 of the row 648 can be assigned one of a number of different bit patterns that can be used to identify a bit position of the respective bit in each memory die. For example, if a codeword (e.g., a RAID parity) includes 1088 bits (1024+64 with 12 parity bits) that are stored over four memory dice such that each memory die stores 272 bits of the codeword, the second portion 648-2 can be assigned one of 269 bit patterns (for the parity matrix 642) or 272 bit patterns (for the parity check matrix 644), which can identify a bit position of the respective bit within each memory die. In this example, in which the codeword includes 1088 bits, the second portion 648-2 can be one of 272 bit patterns from "000000000" to "100001111".

In a non-limiting example, an apparatus (e.g., the computing system 101 illustrated in FIG. 1) can include a plurality of memory units (e.g., the memory units 327 illustrated in FIG. 3) and a controller (e.g., the controller 100 and/or 200 illustrated in FIGS. 1 and 2, respectively) that is communicatively coupled to the plurality of memory units respectively via a plurality of channels (e.g., the channels 125 and/or 225 illustrated in FIGS. 1 and 2, respectively). The controller can be configured to read, from a first group of memory units of the plurality of memory units, a first user data block (UDB) (e.g., the UDB 323 and/or 832 illustrated in FIGS. 3 and 8, respectively) as well as error correction information (e.g., CRC generated at the CRC encoder 213-1 illustrated in FIGS. 2A and 2B)) corresponding to the first UDB. The controller can be further configured to perform an error correction operation (e.g., ECC operation) the first UDB using the error correction information and a parity check matrix (e.g., the parity check matrix 644 illustrated in FIG. 6) including a plurality of bit patterns (e.g., the bit pattern 648 illustrated in FIG. 6), each bit pattern of the plurality of bit patterns including one or more first bits (e.g., the bits 648-1 illustrated in FIG. 6) to identify, among the first group of memory units, a memory unit (e.g., the memory unit 327 illustrated in FIG. 3) corresponding to a bit position of the first UDB having an error.

In some embodiments, the one or more first bits can be indicative of a first data value corresponding to a first memory unit (e.g., the memory unit 327 illustrated in FIG. 3) of the first group of memory units and a second data value corresponding to a second memory unit (e.g., the memory unit 327 illustrated in FIG. 3) of the first group of memory units. Each bit pattern of the plurality of bit patterns can further include one or more second bits (e.g., the bits 648-2 illustrated in FIG. 6) to identify a respective bit position of each subset of subsets (e.g., the subsets 431, 531, 731, and/or 831 illustrated in FIGS. 3-5 and 7-8, respectively) of the first UDB respectively corresponding to memory units of the first group of memory units. In this example, the controller can be further configured to, in response to a resulting bit pattern of the error correction operation indicating the first data value in those bit positions corresponding to the respective one or more first bits of the parity check matrix, correct an error of a respective bit position as indicated by the one or more second bits and of a subset (e.g., the subset 431, 531, 731, and/or 831 illustrated in FIGS. 3-5 and 7-8, respectively) corresponding to the first memory unit.

In some embodiments, the controller can be further configured to, in response to receipt of a read command, read, from one or more second memory units (e.g., the memory units 327 illustrated in FIG. 3), a redundant array of independent disks (RAID) parity data (e.g., RAID parity data of the PDB 339 illustrated in FIG. 3) corresponding to the first UDB and perform a RAID operation (e.g., the RAID operation 752 and/or 852 illustrated in FIGS. 7 and 8, respectively) on the first UDB prior to the error correction operation. In this example, the controller can be further configured to perform another error correction operation (e.g., ECC operation) prior to the RAID operation and using the error correction information.

In another non-limiting example, an apparatus (e.g., the computing system 101 illustrated in FIG. 1) can include a plurality of memory units (e.g., the memory units 327 illustrated in FIG. 3) and a controller (e.g., the controller 100 and/or 200 illustrated in FIGS. 1 and 2, respectively) that is communicatively coupled to the plurality of memory units respectively via a plurality of channels (e.g., the channels 125 and/or 225 illustrated in FIGS. 1 and 2, respectively). The controller can be configured to receive a read command to access a user data block (UDB) (e.g., the UDB 323 and/or 832 illustrated in FIGS. 3 and 8, respectively) stored in a first group of memory units of the plurality of memory units. In response to receipt of the read command, the controller can be further configured to read, from the first group of memory units, the UDB having subsets (e.g., the subsets 431, 531, 731, and/or 831 illustrated in FIGS. 3-5 and 7-8, respectively) respectively corresponding to memory units of the first group and auxiliary data comprising error correction information (e.g., ECC data generated at the ECC encoder 216-1). The controller can be further configured to read, from one or more second memory units (e.g., the memory units 327 illustrated in FIG. 3), a parity data block (PDB) (e.g., the PDB 339 illustrated in FIG. 3) corresponding to the UDB and comprising data recovery information (e.g., RAID parity). The controller can be further configured to perform, using the data recovery information of the PDB and in response to the UDB being indicated as containing one or more bit errors, a data recovery operation (e.g., the RAID operation 752 and/or 852 illustrated in FIGS. 7 and 8, respectively) on at least one subset of the subsets to recover the at least one subset. The controller can be further configured to perform, using the error correction information, an error correction operation on the subsets of the UDB to correct one or more bit errors remaining in the subsets subsequent to the data recovery operation.

In some embodiments, the controller can be configured to perform the error correction operation using a parity check matrix (e.g., the parity check matrix 644 illustrated in FIG. 6) comprising a plurality of bit patterns (e.g., the bit pattern 648 illustrated in FIG. 6). Each bit pattern of the plurality of bit patterns can further include one or more first bits (e.g., the bits 648-1 illustrated in FIG. 6) indicative of data values respectively assigned to the subsets of the UDB and one or more second bits (e.g., the bits 648-2 illustrated in FIG. 6) to indicate a bit position among bit positions of a respective subset of the subsets of the UDB.

In some embodiments, the auxiliary data can further include error detection information (e.g., CRC generated at the CRC encoder 213-1 illustrated in FIGS. 2A and 2B). The controller can be configured to perform an error detection operation (e.g., CRC check) using the error detection information to indicate one or more bit errors in the UDB and further perform the data recovery operation responsive to the error detection operation indicating the one or more bit errors in the UDB. Continuing with this example, the controller can be configured to perform an error correction operation on the UDB to correct one or more bit errors in the UDB prior to the error detection operation.

In some embodiments, the auxiliary data can further include error detection information. In this example, the controller can be further configured to perform an error detection operation (e.g., CRC check) on the UDB subsequent to the data recovery operation and to determine if the UDB still contains one or more bit errors.

In a different non-limiting example, an apparatus (e.g., the computing system 101 illustrated in FIG. 1) can include a plurality of memory units (e.g., the memory units 327 illustrated in FIG. 3) configured to store one or more UDBs (UDBs) (e.g., the UDBs 323 and/or 832 illustrated in FIGS. 3 and 8, respectively) and a controller (e.g., the controller 100 and/or 200 illustrated in FIGS. 1 and 2, respectively) communicatively coupled to the plurality of memory units respectively via a plurality of channels (e.g., the channels 125 and/or 225 illustrated in FIGS. 1 and 2, respectively). The controller can be configured to receive data corresponding to a first UDB (e.g., the UDB 323 and/or 832 illustrated in FIGS. 3 and 8, respectively) as part of a write command to write the first UDB to the one or more memory units of the plurality of memory units. The controller can be further configured to generate, to correct one or more bit errors within the first UDB, error correction information (e.g., ECC data generated at the ECC encoder 216-1) using the first UDB and a parity matrix (e.g., the parity matrix 642 illustrated in FIG. 6) comprising a plurality of bit patterns (e.g., the bit pattern 648 illustrated in FIG. 6) each having one or more first bits (e.g., the bits 648-1 illustrated in FIG. 6) to identify a respective memory unit (e.g., the memory unit 327 illustrated in FIG. 3) among the one or more memory units. The controller can be further configured to write the first UDB and the error correction information to at least the one or more memory units of the plurality of memory units.

In some embodiments, the controller can be configured to write, one or more data input/output (DQ) pins, the UDB over respective first portions (e.g., the portions 327-1-1, 327-2-1, 327-3-1, 327-4-1, 327-5-1 illustrated in FIG. 3) of the at least the one or more memory units. The controller can be further configured to write, one or more data mask inversion (DMI) pins, the error correction information over respective second portions (e.g., the portions 327-1-2, 327-2-2, 327-3-2, 327-4-2, 327-5-2 illustrated in FIG. 3) of the at least the one or more memory units.

In some embodiments, each bit pattern of the parity matrix further can include a plurality of second bits (e.g., the bits 648-2 illustrated in FIG. 6) to identify a respective bit position within a subset of the UDB corresponding to a respective memory unit (e.g., the memory unit 327 illustrated in FIG. 3) of the one or more memory units. In some embodiments, the first UDB corresponds to a particular cache line (e.g., the cache line 332 illustrated in FIG. 3), the particular cache line comprising the first UDB and a second UDB (e.g., the UDB 323 and/or 832 illustrated in FIGS. 3 and 8, respectively). In this example, the controller can be configured to generate error detection information (e.g., CRC generated at the CRC encoder 213-1 illustrated in FIGS. 2A and 2B) based on the first UDB and the second UDB.

Figure 8:
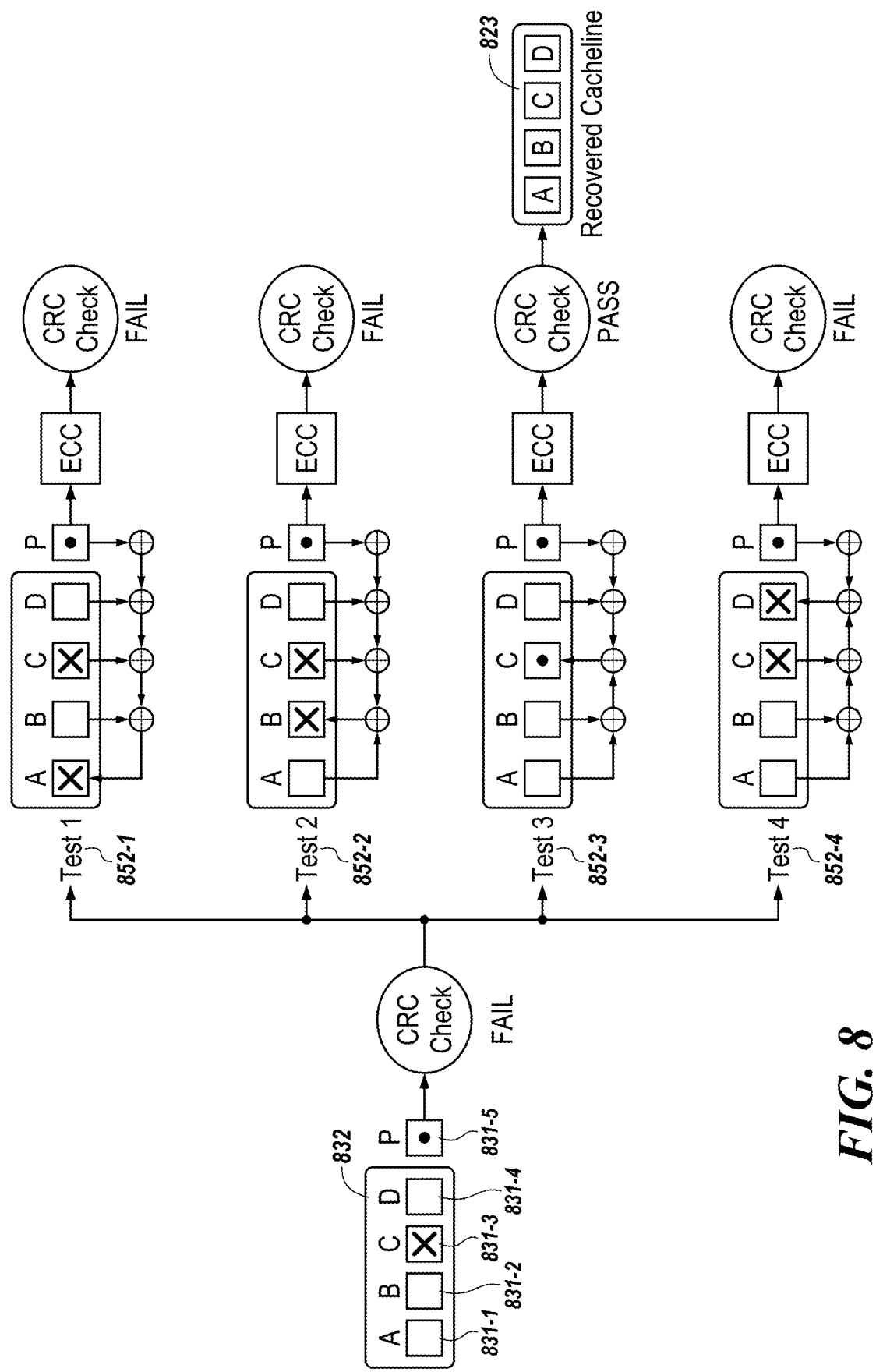
FIG. 8 is a block diagram schematically illustrating a locked-RAID process for data protection of one or more subsets of UDBs corresponding to a cache line in accordance with a number of embodiments of the present disclosure.

In some embodiments, the first UDB corresponds to a particular redundant array of independent disks (RAID) stripe, the RAID stripe comprising the first UDB and a second UDB (e.g., the UDB 323 and/or 832 illustrated in FIGS. 3 and 8, respectively). In this example, the controller can be further configured to generate data recovery information (e.g., RAID parity of the PDB 339 illustrated in FIG. 3) based on the first UDB and the second UDB corresponding to the particular RAID stripe.

Continuing with this example, the controller can be configured to read, from the at least the one or more memory units of the plurality of memory units, the RAID stripe comprising the first UDB and the second UDB in response to a read command to access the first UDB or the second UDB. The controller can be further configured to perform a RAID operation (e.g., the RAID operation 752 and/or 852 illustrated in FIGS. 7 and 8, respectively) on one of a plurality of subsets (e.g., the subsets 431, 531, 731, and/or 831 illustrated in FIGS. 3-5 and 7-8, respectively) of the RAID stripe respectively corresponding to the at least the one or more memory units of the plurality of memory units.

Figure 7:
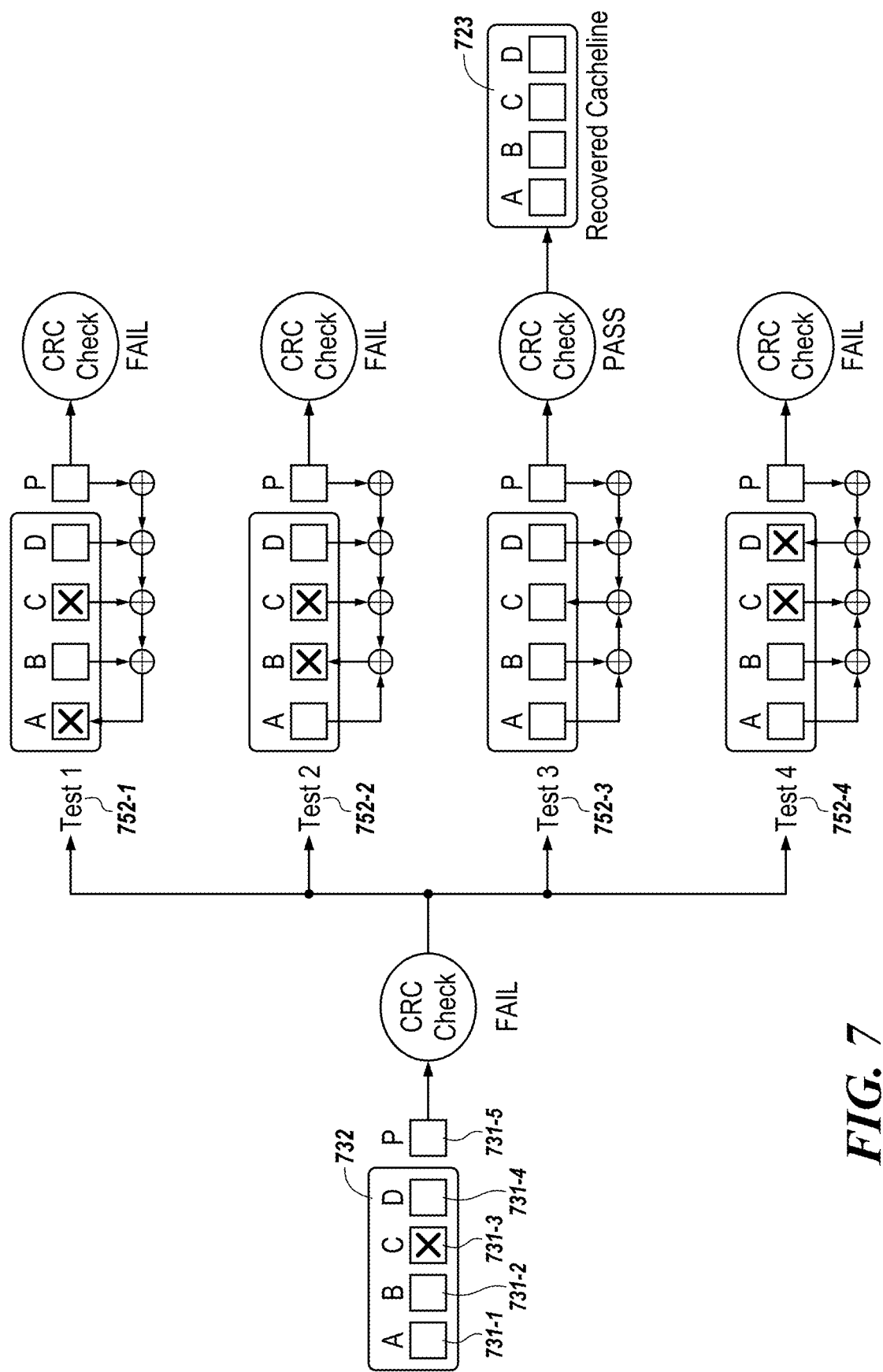
FIG. 7 is a block diagram schematically illustrating a locked-RAID process for data protection of subsets of one or more user data blocks (UDBs) corresponding to a cache line in accordance with a number of embodiments of the present disclosure.

FIG. 7 is a block diagram schematically illustrating a locked-RAID process for data protection of subsets 731-1, . . . , 731-4 of one or more user data blocks (UDBs) corresponding to a cache line 732 in accordance with a number of embodiments of the present disclosure. The subsets 731-1, . . . , 731-5 can be analogous to the subsets 431-1, . . . , 431-5 and/or the subsets 531-1, . . . , 531-5 illustrated in FIGS. 4 and 5, respectively.

As illustrated in FIG. 7, the cache line 732 includes four data subsets (alternatively referred to as "subsets" herein), such as subsets 731-1 (subset "A" shown in FIG. 7), 731-2 (subset "B" shown in FIG. 7), 731-3 (subset "C" shown in FIG. 7), 731-4 (subset "D" shown in FIG. 7) illustrated in FIG. 7 can respectively correspond to memory dice (e.g., the memory dice 327-1, . . . , 327-4 illustrated in FIG. 3) of a RAID channel (e.g., the RAID channel 329 illustrated in FIG. 3) that can be error-recovered using a PDB (e.g., the PDB 339 illustrated in FIG. 3) of the subset 731-5 (subset "P" shown in FIG. 7).

FIG. 7 illustrates an example scenario, in which the subset "C" includes one or more errors that caused a failure of a CRC check (e.g., alternatively referred to as an error detection operation) performed at the CRC decoder (e.g., the CRC decoder 213-2 illustrated in FIGS. 2A and/or 2B, respectively). At the RAID decoder 214-2, one or more RAID operations are performed (e.g., in serial or in parallel) on four different combinations/scenarios, as further described below.

For example, a RAID operation 752-1 (shown as "TEST A" in FIG. 7) is performed based on postulation that the subset "A" has caused the failure of the CRC check; a RAID operation 752-2 (shown as "TEST B" in FIG. 7) is performed based on postulation that the subset "B" has caused the failure of the CRC check; a RAID operation 752-3 (shown as "TEST C" in FIG. 7) is performed based on postulation that the subset "C" has caused the failure of the CRC check; and a RAID operation 752-4 (shown as "TEST D" in FIG. 7) is performed based on postulation that the subset "D" has caused the failure of the CRC check.

Subsequent to each RAID operation 752, the subsets 731-1, . . . , 731-4 can be respectively checked for errors (e.g., at the CRC decoder 215 and/or 415 illustrated in FIGS. 2 and 4, respectively). As illustrated in FIG. 7, the subsets 731-1, . . . , 731-4 with the RAID operation 752-3 passes the CRC check because the RAID operation 752-3 performed properly recovered the cache line 732, while the other RAID operations 752-1, 752-2, and 752-4 missed to recover the subset "C", but rather further causes errors in respective subsets "A", "B", and "D".

The RAID operations 752 can be performed in various manners in conjunction with one or more CRC checks. In one example, the RAID operations 752 are performed sequentially with a respective CRC check performed subsequent to each RAID operation. For example, the RAID operations 752 can be performed in a sequence of 752-1, 752-2, and 752-3 with three CRC checks performed subsequent to each RAID operations 752-1, 752-2, and 752-3. Since the CRC check performed subsequent to the RAID operation 752-3 will say "pass" (e.g., no errors in the subsets 431), the RAID process is completed and the RAID operation 752-4 needs not be performed. In another example, the RAID operations 752 are performed in parallel on (e.g., copies of) the subsets 731-1, . . . , 731-4. In this example, the CRC checks are performed respectively for the RAID operations 752 and the copy of the cache line 732 (on which the RAID operation 752-2 is performed) with "pass" will be further transferred to the security decoder (e.g., the security decoder 217-2 illustrated in FIGS. 2A and/or 2B).

FIG. 8 is a block diagram schematically illustrating a locked-RAID process for data protection of subsets of one or more user data blocks (UDBs) corresponding to a cache line 832 in accordance with a number of embodiments of the present disclosure. The subsets 831-1, . . . , 831-5 can be analogous to the subsets 431-1, . . . , 431-5 and/or the subsets 531-1, . . . , 531-5 illustrated in FIGS. 4 and 5, respectively.

As illustrated in FIG. 8, the cache line 832 includes four data subsets (alternatively referred to as "subsets" herein), such as subsets 831-1 (subset "A" shown in FIG. 8), 831-2 (subset "B" shown in FIG. 8), 831-3 (subset "C" shown in FIG. 8), 831-4 (subset "D" shown in FIG. 8) illustrated in FIG. 8 can respectively correspond to memory dice (e.g., the memory dice 327-1, . . . , 327-4 illustrated in FIG. 3) of a RAID channel (e.g., the RAID channel 329 illustrated in FIG. 3) that can be error-recovered using a PDB (e.g., the PDB 339 illustrated in FIG. 3) of the subset 831-5 (subset "P" shown in FIG. 8).

FIG. 8 illustrates an example scenario, in which the subset "C" includes an amount of errors that the ECC decoder (e.g., the ECC decoder 220 and/or 520 illustrated in FIGS. 2 and 5, respectively) may not be capable of correcting and the subset "P" includes one or more errors that the ECC decoder 520 may be capable of correcting. At the RAID decoder 214-2, one or more RAID operations are performed (e.g., in serial or in parallel) on four different combinations/scenarios. For example, a RAID operation 852-1 (shown as "TEST A" in FIG. 8) is performed based on postulation that the subset "A" has caused the failure of the CRC check; a RAID operation 852-2 (shown as "TEST B" in FIG. 8) is performed based on postulation that the subset "B" has caused the failure of the CRC check; a RAID operation 852-3 (shown as "TEST C" in FIG. 8) is performed based on postulation that the subset "C" has caused the failure of the CRC check; and a RAID operation 852-4 (shown as "TEST D" in FIG. 8) is performed based on postulation that the subset "D" has caused the failure of the CRC check.

As illustrated in FIG. 8, the RAID operation 852-3 performed using the subset "P" and on the subset "C" may partially recover the subset "C" to the extent that the recovered subset "C" may still include an error (e.g., as the subset "P" includes a bit error), which, however, may be correctable by the ECC decoder 520. Therefore, subsequent to the RAID operation 852-3, the subsets 831-1, . . . , 831-4 are input to the ECC decoder (e.g., the ECC decoder 220 and/or 520 illustrated in FIGS. 2 and 5, respectively) at which the bit error of the subset "C" is corrected. The subsets 831-1, . . . , 831-4 are subsequently input to the CRC decoder (e.g., the CRC decoder 215 and/or 515 illustrated in FIGS. 2 and 5, respectively), which indicates "PASS" (while CRC checks performed on results of the other RAID operations 852-1, 852-2, and 852-4 fail as the RAID operations further caused errors in respective subsets "A", "B", and "D").

As illustrated herein, the RAID operations 852 can be performed in various manners in conjunction with one or more CRC checks. In one example, the RAID operations 852 are performed sequentially with a respective CRC check performed subsequent to each RAID operation. For example, the RAID operations 852 can be performed in a sequence of 852-1, 852-2, and 852-3 with three CRC checks performed subsequent to each RAID operations 852-1, 852-2, and 852-3. Since the CRC check performed subsequent to the RAID operation 852-3 will say "pass" (e.g., no errors in the subsets 431), the RAID process is completed and the RAID operation 852-4 needs not be performed. In another example, the RAID operations 852 are performed in parallel on (e.g., copies of) the subsets 831-1, . . . , 831-4. In this example, the CRC checks are performed respectively for the RAID operations 852 and the copy of the cache line 832 (on which the RAID operation 852-2 is performed) with "pass" will be further transferred to the security decoder (e.g., the security decoder 217-2 illustrated in FIGS. 2A and/or 2B).

Figure 9:
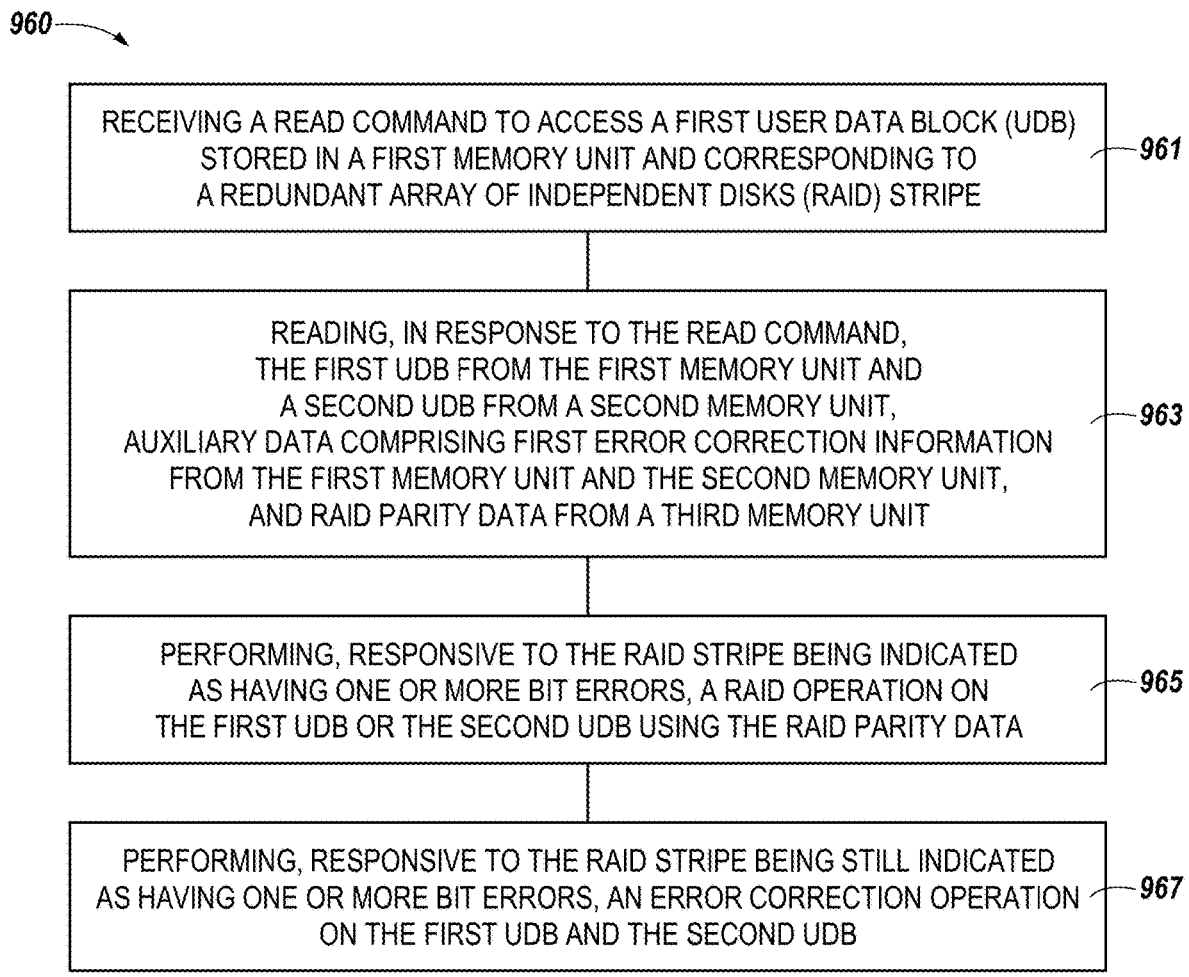
FIG. 9 is a flow diagram of a method for providing ECC schemes that operate in conjunction with RAID protection in accordance with a number of embodiments of the present disclosure.

FIG. 9 is a flow diagram of a method for providing ECC schemes that operate in conjunction with RAID protection in accordance with a number of embodiments of the present disclosure. The method 960 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 060 is performed by the memory controller 100 and/or 200 illustrated in FIGS. 1 and 2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 961, a read command to access a first user data block (UDB) (e.g., the UDB 323 and/or 832 illustrated in FIGS. 3 and 8, respectively) stored in a first memory unit (e.g., the memory units 327 illustrated in FIG. 3) and corresponding to a first redundant array of independent disks (RAID) stripe can be received. At 963, in response to the read command, the first UDB and a second UDB (corresponding to the RAID stripe) can be respectively read from the first memory unit and a second memory unit (e.g., the memory units 327 illustrated in FIG. 3). In response to the read command, auxiliary data including error correction information (e.g., ECC data generated at the ECC encoder 216-1 illustrated in FIGS. 2A and 2B) can be further read from the first memory unit and the second memory unit. In response to the read command, a RAID parity data (e.g., RAID parity data of the PDB 339 illustrated in FIG. 3) can be further read from a third memory unit (e.g., the memory units 327 illustrated in FIG. 3).

At 965, a RAID operation (e.g., the RAID operation 752 and/or 852 illustrated in FIGS. 7 and 8, respectively) can be performed on the first UDB or the second UDB using the RAID parity data responsive to the RAID stripe being indicated as having one or more bit errors. At 967, an error correction operation can be performed on the first UDB and the second UDB responsive to the RAID stripe being still indicated as having one or more bit errors.

In some embodiments, the auxiliary data can further include cyclic redundancy check (CRC) data (e.g., CRC generated at the CRC encoder 213-1 illustrated in FIGS. 2A and 2B). In this example, an error detection operation (e.g., CRC check) can be performed (prior to perform the RAID operation) on the first UDB and the second UDB using the CRC data to indicate whether the first UDB or the second UDB includes the one or more bit errors.

In some embodiments, the error correction operation can be performed on the first UDB and the second UDB using a parity check matrix (e.g., the parity check matrix 644 illustrated in FIG. 6) including a plurality of bit patterns (e.g., the bit pattern 648 illustrated in FIG. 6). Each bit pattern of the plurality of bit patterns can further include one or more first bits (e.g., the bits 648-1 illustrated in FIG. 6) indicative of data values respectively indicative of the first memory unit and the second memory unit and one or more second bits (e.g., the bits 648-2 illustrated in FIG. 6) to indicate a bit position among bit positions corresponding to the first memory unit or the second memory unit.

Continuing with this example, the error correction operation can be performed by performing (to generate second error correction information based on the first UDB and the second UDB read from the first and second memory units) a comparison (by performing one or more XOR operations) among bit patterns of the parity check matrix respectively corresponding to one or more bit positions of the first UDB or the second UDB having a particular data value. The second error correction information can be compared (e.g., by being XORed) to the first error correction information (previously generated at the ECC encoder 216-1 illustrated in FIGS. 2A and 2B and read from the first and the second memory units). Responsive to a result of the comparison being a non-zero syndrome and corresponding to a particular bit pattern of the parity check matrix, a bit error can be corrected based on a bit position of the first UDB or the second UDB indicated by the particular bit pattern.

In some embodiments, the first UDB and the second UDB can include a plurality of subsets (e.g., the subsets 431, 531, 731, and/or 831 illustrated in FIGS. 3-5 and 7-8, respectively). In this example, one or more XOR operations can be performed among the other subsets of the plurality of subsets to recover a subset of the plurality of subsets of the first UDB and the second UDB.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a plurality of memory units; and
a controller communicatively coupled to the plurality of memory units respectively via a plurality of channels, the controller configured to:
read, from a first group of memory units of the plurality of memory units, a first user data block (UDB) as well as error correction information corresponding to the first UDB; and
perform, to perform an error correction operation on the first UDB using the error correction information and a parity check matrix including a plurality of bit patterns, one or more XOR operations between:
each bit of the first UDB and the error correction information having a particular bit value; and
a respective bit pattern of the plurality of bit patterns, wherein each bit pattern of the plurality of bit patterns includes one or more first bits to identify, among the first group of memory units, a memory unit corresponding to a bit position of the first UDB having an error.

2. The apparatus of claim 1, wherein the one or more first bits are indicative of:
a first data value corresponding to a first memory unit of the first group of memory units; and
a second data value corresponding to a second memory unit of the first group of memory units.

3. The apparatus of claim 2, wherein each bit pattern of the plurality of bit patterns further comprises one or more second bits to identify a respective bit position of each subset of subsets of the first UDB respectively corresponding to memory units of the first group of memory units.

4. The apparatus of claim 3, wherein the controller is further configured to, in response to a resulting bit pattern of the error correction operation indicating the first data value in those bit positions corresponding to the respective one or more first bits of the parity check matrix:
correct an error of a respective bit position as indicated by the one or more second bits and of a subset corresponding to the first memory unit.

5. The apparatus of claim 1, wherein the controller is further configured to, in response to receipt of a read command:
read, from one or more second memory units, a redundant array of independent disks (RAID) parity data corresponding to the first UDB; and
perform a RAID operation on the first UDB prior to the error correction operation.

6. The apparatus of claim 5, wherein the controller is further configured to perform another error correction operation prior to the RAID operation and using the error correction information.

7. An apparatus, comprising:
a plurality of memory units; and
a controller communicatively coupled to the plurality of memory units respectively via a plurality of channels, the controller configured to:
receive a read command to access a user data block (UDB) stored in a first group of memory units of the plurality of memory units;
in response to receipt of the read command:
read, from the first group of memory units, the UDB having subsets respectively corresponding to memory units of the first group and auxiliary data comprising error correction information;
read, from one or more second memory units, a parity data block (PDB) corresponding to the UDB and comprising data recovery information that are different from the error correction information; and
perform, using the data recovery information of the PDB and in response to the UDB being indicated as containing one or more bit errors, a data recovery operation on at least one subset of to the plurality of subsets to recover the at least one subset; and
perform, using the error correction information, an error correction operation on the subsets of the UDB to correct one or more bit errors remaining in the subsets subsequent to the data recovery operation.

8. The apparatus of claim 7, wherein the controller is configured to perform the error correction operation using a parity check matrix comprising a plurality of bit patterns, wherein each bit pattern of the plurality of bit patterns further comprises:
one or more first bits indicative of data values respectively assigned to the subsets of the UDB; and
one or more second bits to indicate a bit position among bit positions of a respective subset of the subsets of the UDB.

9. The apparatus of claim 7, wherein:
the auxiliary data further comprises error detection information; and
the controller is configured to:
perform an error detection operation using the error detection information to indicate one or more bit errors in the UDB; and
perform the data recovery operation responsive to the error detection operation indicating the one or more bit errors in the UDB.

10. The apparatus of claim 9, wherein the controller is configured to perform an error correction operation on the UDB to correct one or more bit errors in the UDB prior to the error detection operation.

11. The apparatus of claim 9, wherein the error detection information corresponds to cyclic redundancy check (CRC) data.

12. The apparatus of claim 7, wherein:
the auxiliary data further comprises error detection information; and
the controller is further configured to perform an error detection operation on the UDB subsequent to the data recovery operation and to determine if the UDB still contains one or more bit errors.

13. An apparatus, comprising:
a plurality of memory units configured to store one or more user data blocks (UDBs); and
a controller communicatively coupled to the plurality of memory units respectively via a plurality of channels, the controller configured to:
  receive data corresponding to a first UDB as part of a write command to write the first UDB to the one or more memory units of the plurality of memory units;
  perform, to generate error correction information, one or more XOR operation between:
    each bit of the first UDB having a particular bit value; and
    a respective bit pattern of a plurality of bit patterns of a parity matrix, wherein each bit pattern of the plurality of bit patterns has one or more first bits to identify a respective memory unit among the one or more memory units; and
  write the first UDB and the error correction information to at least the one or more memory units of the plurality of memory units.

14. The apparatus of claim 13, wherein the controller is configured to:
write, one or more data input/output (DQ) pins, the UDB over respective first portions of the at least the one or more memory units; and
write, one or more data mask inversion (DMI) pins, the error correction information over respective second portions of the at least the one or more memory units.

15. The apparatus of claim 13, wherein each bit pattern of the parity matrix further comprises a plurality of second bits to identify a respective bit position within a subset of the UDB corresponding to a respective memory unit of the one or more memory units.

16. The apparatus of claim 13, wherein:
the first UDB corresponds to a particular redundant array of independent disks (RAID) stripe, the RAID stripe comprising the first UDB and a second UDB; and
the controller is further configured to generate data recovery information based on the first UDB and the second UDB corresponding to the particular RAID stripe.

17. The apparatus of claim 16, wherein the controller is configured to, in response to a read command to access the first UDB or the second UDB:
read, from the at least the one or more memory units of the plurality of memory units, the RAID stripe comprising the first UDB and the second UDB;
perform a RAID operation on one of a plurality of subsets of the RAID stripe respectively corresponding to the at least the one or more memory units of the plurality of memory units.

18. The apparatus of claim 13, wherein:
the first UDB corresponds to a particular cache line, the particular cache line comprising the first UDB and a second UDB; and
the controller is configured to generate error detection information based on the first UDB and the second UDB.

19. A method, comprising:
receiving a read command to access a first user data block (UDB) stored in a first memory unit and corresponding to a redundant array of independent disks (RAID) stripe;
reading, in response to the read command:
  the first UDB from the first memory unit and a second UDB from a second memory unit, wherein the second UDB corresponds to the RAID stripe as well;
  auxiliary data comprising first error correction information from the first memory unit and the second memory unit; and
  RAID parity data from a third memory unit;
performing, responsive to the RAID stripe being indicated as having one or more bit errors, a RAID operation on the first UDB or the second UDB using the RAID parity data; and
performing, responsive to the RAID stripe being still indicated as having one or more bit errors, an error correction operation on the first UDB and the second UDB using the first error correction information.

20. The method of claim 19, wherein the auxiliary data further comprises cyclic redundancy check (CRC) data, and wherein the method further comprises performing, prior to perform the RAID operation, an error detection operation on the first UDB and the second UDB using the CRC data to indicate whether the first UDB or the second UDB includes the one or more bit errors.

21. The method of claim 19, further comprising performing the error correction operation on the first UDB and the second UDB using a parity check matrix comprising a plurality of bit patterns, wherein each bit pattern of the plurality of bit patterns further comprises:
one or more first bits indicative of data values respectively indicative of the first memory unit and the second memory unit; and
one or more second bits to indicate a bit position among bit positions corresponding to the first memory unit or the second memory unit.

22. The method of claim 21, wherein performing the error correction operation on the first UDB and the second UDB using the parity check matrix further comprises:
performing, to generate second error correction information based on the first UDB and the second UDB read from the first and second memory units, a comparison among bit patterns of the parity check matrix respectively corresponding to one or more bit positions of the first UDB or the second UDB having a particular data value; and
comparing the second error correction information to the first error correction information; and
responsive to a result of the comparison being a non-zero syndrome and corresponding to a particular bit pattern of the parity check matrix, correct a bit error of a bit position of the first UDB or the second UDB as indicated by the particular bit pattern.

23. The method of claim 22, wherein performing the comparison among the bit patterns of the parity check matrix respectively corresponding to the one or more bit positions of the first UDB or the second UDB having the particular data value further comprises performing one or more XOR operations among the bit patterns.

24. The method of claim 22, wherein comparing the second error correction information to the first error correction information further comprises performing an XOR operation between the first error correction information and the second error correction information.

25. The method of claim 19, wherein the first UDB and the second UDB comprises a plurality of subsets, and wherein the method further comprises performing, to recover a subset of the plurality of subsets of the first UDB and the second UDB, one or more XOR operations among the other subsets of the plurality of subsets.

* * * * *